United States Patent
Zamanpour et al.

(10) Patent No.: US 12,315,354 B2
(45) Date of Patent: May 27, 2025

(54) METHOD AND APPARATUS FOR DETECTING FALL EVENTS

(71) Applicant: Epic Safety Inc., North Vancouver (CA)

(72) Inventors: Mohammad Zamanpour, North Vancouver (CA); Salman Hassanpour Zahraei, Tehran (IR); Mohammad Soltanian, Karaj (IR); Majid Shokoufi, Vancouver (CA)

(73) Assignee: Epic Safety Inc., North Vancouver (CA)

( * ) Notice: Subject to any disclaimer, the term of this patent is extended or adjusted under 35 U.S.C. 154(b) by 11 days.

(21) Appl. No.: 18/088,227

(22) Filed: Dec. 23, 2022

(65) Prior Publication Data

US 2023/0215261 A1 Jul. 6, 2023

Related U.S. Application Data

(63) Continuation of application No. PCT/CA2021/050914, filed on Jul. 5, 2021.

(Continued)

(51) Int. Cl.
*G08B 21/00* (2006.01)
*G08B 21/04* (2006.01)
*G08B 29/18* (2006.01)

(52) U.S. Cl.
CPC ....... *G08B 21/043* (2013.01); *G08B 21/0446* (2013.01); *G08B 29/186* (2013.01)

(58) Field of Classification Search
CPC .......... G08B 21/043; G08B 21/0446; G08B 29/186; G01P 15/0891

(Continued)

(56) References Cited

U.S. PATENT DOCUMENTS

| | | | | |
|---|---|---|---|---|
| 2010/0052896 A1* | 3/2010 | Goodman | ............... | G01P 15/00 340/584 |
| 2012/0259577 A1* | 10/2012 | Ganyi | ............... | G08B 21/0446 702/139 |

(Continued)

FOREIGN PATENT DOCUMENTS

WO WO-2011116406 A2 * 9/2011 ........... A61B 5/1117

OTHER PUBLICATIONS

Pillai et al, "Wearable Sensor and Machine Learning Model-Based Fall Detection System for Safety of Elders and Movement Disorders", 2022.

(Continued)

*Primary Examiner* — Mark S Rushing
(74) *Attorney, Agent, or Firm* — Todd A. Rattray; Oyen Wiggs Green & Mutala LLP

(57) ABSTRACT

There is provided a method and apparatus for detecting a fall event of the user. The method includes collecting data associated with activities of the user from sensors and distributing the collected data to data sub-windows using signal windowing and segmentation, the data sub-windows indicative of a pre-fall moment, a fall moment, and a post-fall moment. The method includes extracting features from the data sub-windows and determining whether the event is a fall event using the extracted features. The determination of whether the event is a fall event can be determined by applied support vector machine technique. The developed machine learning based methods may balance a trade-off between accuracy and complexity of the evaluation. The method further includes multiple rejection filters mitigate false alarms due to fall-like activities of daily living. The method includes a personalization process to update the machine learning based methods associated with each user.

18 Claims, 29 Drawing Sheets

Related U.S. Application Data

(60) Provisional application No. 63/048,522, filed on Jul. 6, 2020.

(58) Field of Classification Search
USPC .................................................. 340/573.1
See application file for complete search history.

(56) References Cited

U.S. PATENT DOCUMENTS

| | | | | |
|---|---|---|---|---|
| 2013/0120147 | A1* | 5/2013 | Narasimhan | G08B 21/0446 |
| | | | | 73/507 |
| 2014/0313036 | A1* | 10/2014 | Sweeney | G08B 21/043 |
| | | | | 340/573.1 |
| 2015/0020571 | A1* | 1/2015 | Chan | G01P 21/00 |
| | | | | 73/514.01 |
| 2017/0270481 | A1* | 9/2017 | Morgenthau | H04W 4/80 |
| 2017/0352240 | A1* | 12/2017 | Carlton-Foss | A61B 5/1116 |
| 2021/0366257 | A1* | 11/2021 | Ten Kate | G08B 21/182 |

OTHER PUBLICATIONS

Nahian et al, "Towards an Accelerometer-Based Elderly Fall Detection System Using Cross-Disciplinary Time Series Features", Feb. 2, 2021.
Nahian et al, "Social Group Optimized Machine-Learning Based Elderly Fall detection Approach Using Interdisciplinary Time-Series Features", Feb. 27, 2021.
Yu et al, "Machine Learning-Based Pre-impact Fall Detection and Injury Prevention for the Elderly with Wearable Inertial Sensors", 2021.
Thakur et al, "A Study of Fall Detection in Assisted Living Identifying and Improving the Optimal Machine Learning Method", Jun. 24, 2021.
Zurbuchen et al, "A Machine Learning Multi-Class Approach for Fall Detection Systems Based on Wearable Sensors with a Study on Sampling Rates Selection", Jan. 30, 2021.
Gjoreski et al, "Wearable Sensors Data-Fusion and Machine-Learning Method for Fall Detection and Activity Recognition", 2020.
Anceschi et al, "SaveMeNow.AI a Machine Learning Based Wearable Device for Fall Detection in a Workplace", 2021.
Nahiduzzaman et al, "Machine Learning Based Early Fall Detection for Elderly People with Neurological Disorder Using Multimodal Data Fusion", 2020.
Badgujar et al, "Fall Detection for Elderly People using Machine Learning", Jul. 2020.
Ramachandran et al, "Evaluation of Feature Engineering on Wearable Sensor-based Fall Detection", 2020.
Soni et al, "An Approach to Enhance Fall Detection Using Machine Learning Classifier", 2020.
Liu et al, "An Analysis of Segmentation Approaches and Window Sizes in Wearable-Based Critical Fall Detection Systems With Machine Learning Models", 2020.
Palmerini et al, "Accelerometer-Based Fall Detection Using Machine Learning Training and Testing on Real-World Falls", Nov. 13, 2020.
Desai et al, "A Novel Machine Learning Based Wearable Belt for Fall Detection", Oct. 2020.
Nahar et al, "A Machine Learning Based Fall Detection for Elderly People with Neurodegenerative Disorders", 2020.
Zurbuchen et al, "A Comparison of Machine Learning Algorithms for Fall Detection using Wearable Sensors", 2020.
Yacchirema et al, "Fall detection system for elderly people using IoT and ensemble machine learning algorithm", Jan. 2, 2019.
Saleh et al, "Elderly Fall Detection Using Wearable Sensors a Low Cost Highly Accurate Algorithm", 2019.
Hussain et al, "An Efficient Machine Learning-based Elderly Fall Detection Algorithm", 2019.
Hussain et al, "Activity-Aware Fall Detection and Recognition Based on Wearable Sensors", Jun. 15, 2019.
Ramachandran et al, "Machine Learning-Based Techniques for Fall Detection in Geriatric Healthcare Systems", 2018.
Liu et al, "Impact of Sampling Rate on Wearable-Based Fall Detection Systems Based on Machine Learning Models", 2018.
Rodrigues et al, "Fall Detection System by Machine Learning Framework for Public Health", 2018.
Quadros et al, "A Movement Decomposition and Machine Learning-Based Fall Detection System Using Wrist Wearable Device", Jun. 15, 2018.
Putra et al, "Window-size impact on detection rate of wearable-sensor-based fall detection using supervised machine learning", 2017.
Aziz et al, Validation of accuracy of SVM-based fall detection system using real-world fall and non-fall datasets:, Jul. 5, 2017.
Hemmatpour et al, "A Neural Network Model Based on Co-occurrence Matrix for Fall Prediction", 2017.
Zhen et al, "Wearable Preimpact Fall Detector using SVM", 2016.
Bourke et al, "Fall detection algorithms for real-world falls harvested from lumbar sensors in the elderly population a machine learning approach", 2016.
Hossain et al, "A Direction-Sensitive Fall Detection System Using Single 3D Accelerometer and Learning Classifier", 2016.
Pierleoni et al, "SVM-based fall detection method for elderly people using Android low-cost smartphones", 2015.
Yuan et al, "Power-Efficient Interrupt-Driven Algorithms for Fall Detection and Classification of Activities of Daily Living" Mar. 2015.
Gibson et al, "Multiple comparator classifier framework for accelerometer-based fall detection and diagnostic", 2015.
Kerdegari et al, "A pervasive neural network based fall detection system on smart phone", 2015.
Li et al, "Integrating the enriched feature with machine learning algorithms for human movement and fall detection", 2014.
Rescio et al, "Supervised Expert System for Wearable MEMS Accelerometer-Based Fall Detector", 2013.
Tong et al, "HMM-Based Human Fall Detection and Prediction Method Using Tri-Axial Accelerometer", May 5, 2013.
Kerdegari et al, "Evaluation of fall detection classification approaches", 2012.
Aziz et al, "Distinguishing near-falls from daily activities with wearable accelerometers and gyroscopes using Support Vector Machines", Sep. 1, 2012.
Ojetola et al, "Fall Detection with Wearable Sensors—Safe (Smart Fall Detection)", 2011.
Yuwono et al, "Fall detection using a Gaussian distribution of clustered knowledge, augmented radial basis neural-network, and multilayer perceptron", Nov. 2011.
Choi et al, "A Study on Machine Learning Algorithms for Fall Detection and Movement Classification", 2011.
Erdogan et al, "A data mining approach for fall detection by using k-nearest neighbour algorithm on wireless sensor network data", Mar. 28, 2011.
Dinh et al, "A Fall and Near-Fall Assessment and Evaluation System", 2009.
Karantonis et al, "Implementation of a real-time human movement classifier using a triaxial accelerometer for ambulatory monitoring", Jan. 1, 2006.
Zhang et al, "Fall Detection by Wearable Sensor and One-Class SVM Algorithm", 2006.

\* cited by examiner

METHOD AND APPARATUS FOR DETECTING FALL EVENTS

REFERENCE TO RELATED APPLICATIONS

This application is a continuation of Patent Cooperation Treaty (PCT) application No. PCT/CA2021/050914 having an international filing date of 5 Jul. 2021, which in turn claims priority from, and for the purposes of the United States of America the benefit under 35 USC 119 in connection with, U.S. patent application No. 63/048,522 filed 6 Jul. 2020. All of the applications referred to in this paragraph are hereby incorporated herein by reference.

TECHNICAL FIELD

The present invention pertains to the field of detecting motions of a user, and in particular to methods and apparatuses for detecting a fall event of a user.

BACKGROUND

As many things can cause a fall, there is always a possibility that an individual falls. The risk of a fall is even higher for people in a certain profession (e.g. firefighters) or older people. In fact, it is known that individuals that are 65 years of age or older fall at least once a year.

Falls can be quite detrimental, especially elderly individuals. It has been reported that more than 90% of hip fractures are caused by falls for individuals of 70 years of age or older, and 85% of hospitalizations of elderly people are related to fall events. Moreover, after fall events, elderly people often suffer not only from the physical injuries (e.g. bone fractures) but also from mental distress (e.g. loss of independence and/or fear of falling again).

A dangerous condition after a fall event is known as a "long-lie" condition in which an individual is not able to stand up but remains lying on the ground for an extended period of time. The long-lie condition can cause further psychological and physiological problems such as dehydration and internal bleeding. Reported statistics show that half of individuals who have been in the long-lie condition died within six months after the fall event.

There exists a need for a fall detection system that can automatically and accurately detect fall events in real-time and request for help from caregivers or medical professionals, even when the individual is unconscious. In this manner the time of arrival of medical services can be reduced and mortality rates after fall events can be also decreased.

As a fall can be characterized by features like higher acceleration value compared to the activities of daily living (ADLs), many existing prior art devices mainly use accelerometers to detect fall events. However, fall detection relying solely on higher acceleration values can result in frequent false fall detection especially when the user performs fall-like activities such as sitting down quickly, jumping, going to bed, and when the user drops the fall detection device.

Some fall detection algorithms assume that fall events would always end up with an individual lying on the floor horizontally. Apparatuses with such algorithms use body orientation as a fall indicator. However, such apparatuses may be less effective as at least some fall events do not end up with an individual lying horizontally on the floor (e.g. when the user falls down the stairs).

Some other apparatuses perform fall detection using threshold values. Such apparatuses detect fall events by comparing values obtained from various sensors with predetermined threshold values. However, this method may also be ineffective since the amount of change in the values obtained from sensors can vary largely for different fall events. As such, predetermined threshold values may result in erroneously recognizing a non-fall event as a fall event or vice versa.

Moreover, in order to improve accuracy, many existing fall detection methods use complex inference techniques, such as hidden Markov models, for analyzing data obtained from the sensors. However, such methods are computationally expensive and do not necessarily detect a fall in real-time. As such, these methods also are not appropriate for fall detection, especially where immediate responses are desired.

Another main issue in a fall detection system is personalization. A fall detection system may work very accurately for a certain person, but have moderate accuracy on a different person having very different fall/ADL patterns. To deal with diverse fall patterns of different people, i.e. personalization, some previous studies have proposed to use elderly people data instead of young healthy people to train the fall detector. Some authors offered to employ personal information such as age, gender, height and weight in addition to the fall patterns for designing the algorithm. Furthermore, in some studies, the context and environmental information have been considered along with the user's personal profile to enhance the final accuracy of the fall detection system.

Although these modifications sound interesting, they do not seem to make a big leap in accuracy, mainly due to the unknown relation of fall pattern to the height, weight, or age parameters. Furthermore, regarding training the algorithm by elderly people data, it should be noted that collecting data by elderly people is not feasible due to its high risk.

Therefore, there is a need for a method and apparatus for detecting a fall event that is not subject to one or more limitations of the prior art. This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for detecting a fall event. In accordance with an aspect of the present invention, there is provided a method for detecting an event associated with a user. The method includes collecting data associated with activities of the user from a plurality of sensors and distributing the collected data to data sub-windows using signal windowing and segmentation, the data sub-windows indicative of a pre-fall moment, a fall moment, and a post-fall moment. The method further includes extracting a plurality of features from one or more of the data sub-windows and determining whether the event is a fall event at least in part based on the extracted features. The determination of whether the event is a fall event can further be determined by applying a support vector machine (SVM) technique. The developed machine learning based methods may be substantially optimum in terms of a trade-off between accuracy and complexity of the evaluation. The method further includes multiple rejection filters in order to aid with the prevention of false alarms due to fall-like activities of daily living (ADLs).

In accordance with an aspect of the present invention, the accuracy of determination of whether an event is a fall event is further improved by personalization based on artificial intelligence using individual records of under care elderly people. The determining algorithm is initially trained using machine learning based methods and a data set collected from healthy people, and then downloaded to the fall protection system of an elderly individual. Data windows relating to false alarm events are recorded in the system's memory through input by the individual. The recorded false alarm events are periodically uploaded to a database, and the new information comprising these false alarm events is used to retrain the determining algorithm. The retrained algorithm may then be downloaded to the elderly individual's personalized fall detection system. This personalization process will be repeated in regular periods to ensure the highest possible accuracy and lowest false alarm rate. Additionally or alternatively, the false alarm events of this particular individual, along with false alarm events recorded by other users can be used to globally retrain the algorithm and push this update to all users of the fall detection system.

In accordance with an aspect of the present invention, there is provided an apparatus for detecting an event associated with a user. The apparatus includes a plurality of sensors for collecting data indicative of an event associated with activities of the user, a processor and a memory storing machine executable instructions. The instructions when executed by the processor configure the apparatus to distribute the collected data to data sub-windows using signal windowing and segmentation, the data sub-windows indicative of a pre-fall moment, a fall moment and a post-fall moment and extract a plurality of features from one or more of the data sub-windows. The instructions when executed by the processor further configure the apparatus to determine whether the event is a fall event at least in part based on the extracted features.

In accordance with an aspect of the present invention, A method for detecting an event associated with a user comprises collecting data associated with activities of the user from a plurality of sensors, distributing the collected data into sets indicative of a pre-fall moment, a fall moment, and a post-fall moment, extracting a plurality of features from the one or more sets, and determining whether the event is a fall event at least in part based on the extracted features. The distributing may include distributing the collected data to data sub-windows using signal windowing and segmentation, the data subwindows indicative of a pre-fall moment, a fall moment, and a post-fall moment and the extracting may be performed by extracting a plurality of features from one or more of the data sub-windows.

In accordance with a further aspect, the plurality of sensors includes one or more of an accelerometer, a gyroscope and a barometric pressure sensor.

In accordance with a further aspect, determining may be performed by a machine learning based method using a support vector machine (SVM). Alternatively, determining may be performed by one or more of K-Nearest Neighbor (KNN), a neural network, logistic regression, Naive Bayes and decision tree.

In accordance with a further aspect, each of the plurality of features is extracted in association with one or more of accelerometer data, gyroscope data and barometric pressure data. The plurality of features may be extracted using one or more pre-defined fall templates. The pre-defined fall templates may be generated based on one or more of signal magnitude vector (SMV) of acceleration and barometric pressure data.

In accordance with a further aspect, the method may comprise selecting a subset of data indicative of the extracted features for development of the machine learning based method.

In accordance with a further aspect the method may further comprise, upon the event being determined to be a fall event, evaluating whether the fall event is true or an erroneously recognized fall event. The evaluating may be performed using one or more rejection filters. The rejection filters may include one or more of a dropping rejection filter, a going-to-bed rejection filter, a spinning rejection filter and a stair walking and running down rejection filter.

In accordance with a further aspect, the method may comprise personalizing the method to the user, the personalizing comprising upon determining that the event was a fall event, receiving input from the user indicating that the event was erroneously determined to be a fall event, selecting a second subset of data indicative of the extracted features from the erroneously determined fall event for further development of the machine learning based method, and determining whether further events are fall events for the user wherein the determining is performed by the further developed machine learning based method.

In accordance with a further aspect, the method may comprise normalizing the extracted features.

In accordance with a further aspect, extracting the plurality of features may be performed in one or more of a time domain, a frequency domain and a time-frequency domain.

In accordance with an aspect of the present invention, an apparatus for detecting an event associated with a user comprises a plurality of sensors for collecting data indicative of an event associated with activities of the user, a processor, and a memory storing machine executable instructions, the instructions when executed by the processor configure the apparatus to distribute the collected data into sets indicative of a pre-fall moment, a fall moment and a post-fall moment, extract a plurality of features from one or more of the sets; and determine whether the event is a fall event at least in part based on the extracted features. The plurality of sensors may include one or more of an accelerometer, a gyroscope and a barometric pressure sensor.

In accordance with a further aspect, the instructions when executed by the processor may configure the apparatus to distribute which includes distributing the collected data to data sub-windows using signal windowing and segmentation, the data sub-windows indicative of a pre-fall moment, a fall moment, and a post-fall moment and to extract which includes extracting a plurality of features from one or more of the data subwindows.

In accordance with a further aspect, the apparatus, upon the event being determined to be a fall event, may evaluate whether the fall event is true or an erroneously recognized fall event. The evaluation may be performed using one or more rejection filters.

In accordance with a further aspect, the apparatus may comprise an alarm system, wherein upon determination that the event is a fall event, the alarm system generates a notification of the fall event. The notification may be sent to an external device directly or via a network.

In accordance with a further aspect, the apparatus may comprise a user input device, wherein upon determination that the event is a fall event and in response to a user input indicating that the fall event is a false alarm, the instructions when executed by the processor further configure the apparatus to store the collected data associated with the false alarm in the memory. The determination may be based at least in part on the extracted features and the collected data associated with the false alarm stored in the memory.

In accordance with a further aspect, the instructions when executed by the processor configure the apparatus to normalize the extracted features.

In accordance with a further aspect, extracting the plurality of features is performed in one or more of a time domain, a frequency domain and a time-frequency domain.

In accordance with a further aspect, the apparatus may be portable or wearable.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DESCRIPTION

Definitions

Figure 2:
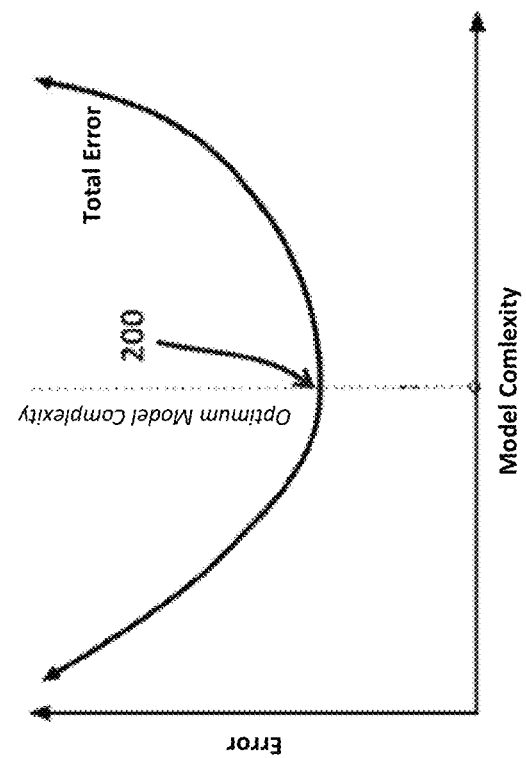
FIG. 2 illustrates a relationship between SVM model generalization error and SVM model complexity.

In the present disclosure, $D_a^{bc}$ represents data in sub-window a, from c-axis of sensor b. Sub-window a may be, for example, one of sub-window 1 ($W_1$), sub-window 2 ($W_2$) and main window ($W_m$). Sensor b may be any sensor that can be used for the purpose of the present disclosure. For instance, sensor b may be one of an accelerometer sensor, gyroscope sensor, and barometric pressure sensor or other sensor configuration as would be readily understood by a worker skilled in the art. The c-axis may be one of the x-axis, y-axis and z-axis.

In the present disclosure, $L_{W_i}$ may refer to the length of window i or the number of samples in window i.

In the present disclosure, $T_{acc}$ may refer to the pre-defined fall template obtained based on SMV of acceleration for a typical fall, and $T_{prs}$ may refer to the pre-defined fall template obtained based on barometric pressure data for a typical fall.

Unless defined otherwise, all technical and scientific terms used herein have the same meaning as commonly understood by one of ordinary skill in the art to which this invention belongs.

Fall Event Detection

Embodiments of the present disclosure provide a method and apparatus for detecting a fall event. The fall detection apparatus may rely on data obtained or captured from multiple sensors (e.g. accelerometer, gyroscope, barometric pressure sensor or other suitable sensor as would be readily understood by a worker skilled in the art) so that the apparatus can have an ability to distinguish complicated patterns of fall events from various activities of daily living (ADLs) based on an analysis of the captured data. Embodiments of the present disclosure may perform detailed fall detection (e.g. determining a fall event that is difficult to distinguish from non-fall event due to small changes in data values delivered from sensors) using machine learning based methods. Through using machine learning based methods, embodiments of the present disclosure may detect a fall event even when the fall event does not cause a person to be lying horizontally on the floor or does not trigger significant changes in data values captured by the sensors or both. The machine learning based methods of the present disclosure can determine whether the activity is a fall event or not without the use of one or more threshold values. Instead of using threshold values, the methods of the present disclosure may distinguish fall events from ADLs using a machine learning based method which can be trained using data of real fall events of the past and may be further refined through the further training relating to data collection during use. Upon detection of a fall event, according to some embodiments of the present disclosure, the apparatus is configured to enable communication be sent to request help from caregivers or medical professionals, or may be configured to perform subsequent procedures (e.g. generating fall alarms).

A common technique used by wearable fall detectors, in particular those with inertial sensors, may be evaluation using threshold-based or rule-based logic. These threshold-based techniques can detect a possible fall based on a procedure that compares data captured by sensors with a predefined threshold value. The threshold-based techniques, in each node, may compare parameters of received signal frames with threshold values that are pre-determined through analysis of training data relating to fall events. The threshold-based techniques, in order to detect falls, may use fixed (static) or variable (adaptive) threshold values on the data value associated with the extracted features.

The threshold(s) used in these methods may be determined by repeating updating until accuracy of fall detection is essentially maximized. According to this method, a fall is detected when collected data indicates features like peaks (fall impacts), valleys, change in body angle and orientation, and other features indicative of a fall. However, a threshold-based method may not be suitable for fall detection when captured signals are different from training data by which reference values are determined. Further, at least in some cases, determination of a threshold value, whether the threshold is fixed or adaptive, can be challenging. As such, the threshold-based fall detection method may result in low accuracy and thus may not be able to detect fall events with high precision. While the threshold-based methods have advantages such as low computational complexity, easy implementation and low power consumption, due to the low accuracy in fall detection, the threshold-based methods are not highly desired.

According to embodiments, there are provided methods at least in part using machine learning based methods for fall detection devices. Generally speaking, machine learning based methods can use complex algorithms that make a prediction by learning information (e.g. extracting patterns) from input data which is used during the training phase for the machine learning based method. While the computational costs can be relatively high, such machine learning based methods can generate outcomes with high accuracy, especially when compared to threshold-based techniques. Machine learning based methods can enhance their performance (e.g. accuracy) when large amounts of data (e.g. training data) is available to train the machine learning based method.

According to embodiments, there is provided a fall detection wearable device, which can be configured as a pendant or wrist device or other wearable device as would be readily understood. The fall detection wearable device or apparatus includes a plurality of sensors for collecting data indicative of an event associated with activities of the user and a processor. The device or apparatus further includes a memory storing machine executable instructions, the instructions when executed by the processor configure the device or apparatus to distribute the collected data to data sub-windows using signal windowing and segmentation, the data sub-windows indicative of a pre-fall moment, a fall moment and a post-fall moment and extract a plurality of features from one or more of the data sub-windows and determine whether the event is a fall event at least in part based on the extracted features and the machine learning techniques including support vector machine (SVM) which may be considered as a preferred method, in terms of the trade-off between accuracy and complexity for fall detection.

In some embodiments, the instructions when executed by the process further configure the device or apparatus to upon the event being determined to be a fall event, the instructions, when executed by the processor further configure the apparatus or device to evaluate whether the fall event is true or an erroneously recognized fall event. In some embodiments, the evaluation is performed by one or more rejection filters. In some embodiments, the device or apparatus further includes an alarm system, wherein upon determination that the event is a fall event, the instruction upon execution by the processor further configured the device or apparatus to generate a notification of the fall event.

In some embodiments, the machine learning based method can be based on a support vector machine (SVM) classification method which can be used for implementation of classification. A SVM classification method may classify a detected event into a fall event or a non-fall event (e.g. ADLs). The SVM classification method may detect fall events with high accuracy without requiring an excessive amount of complex computations. According to embodiments, the SVM classification may substantially simplify implementation of the fall detection algorithm on microprocessors, such as a wearable microcontroller processor or processors for mobile or wearable devices.

In some embodiments, the machine learning based method can be based on an artificial neural network (ANN). ANN includes layers with several neurons in each layer. Each neuron has weights which can be learnt in a training phase. A typical ANN has three layer types including the input layer, hidden layers, and output layer. An input layer is where the input of the ANN is provided. The number of neurons in this layer can depend on the number of inputs into the ANN. Hidden layers come between the input and the output layers and their number can vary. The function that the hidden layer serves is to encode the input and map it to the output. It is known that a multi-layer perceptron (MLP) with only one hidden layer can approximate substantially any function that connects its input with its outputs if such a function exists. An output layer is where the outcome of the ANN can be seen. The number of neurons in the output layer can depend on the problem that the ANN is to learn. ANNs can be divided into several categories such as multi-layer perceptron (MLP), convolutional neural network (CNN), recurrent neural network (RNN) or other formats as would be readily understood by a worker skilled in the art. ANN acts like a function which learns a mapping from the input data to the output targets. So, the ANN can learn to associate features vectors within each temporal window to fall or ADL labels based on collected data from one or more sensors including but not limited to an accelerometer, a gyroscope and a barometric pressure sensor. A common training strategy for ANNs is back propagation in which network weights are determined based on propagating error from the output layer to the input and updating the weights and biases of the network.

It is understood that deep ANNs are ANNs with more than three layers. However, state-of-the-art deep ANNs have many more layers, from tens to hundreds of layers. Deep ANNs have weight sharing to reduce the number of learnable parameters. Deeper ANNs can have special connections between neurons like skip connections to be able to effectively learn complex data. According to embodiments deep ANNs can be used for fall detection, however deep ANNs can typically involve heavy computations, not only at the training phase but also at the deployment phase. Therefore, the use of deep ANNs can be dependent on the desired implementation. For example, the use of deep ANNs in an implementation associated with a pendant device may not be appropriate.

According to embodiments, machine learning based methods can be separated into three steps: pre-process, feature extraction, and classification. Such machine learning based methods have a training phase and a testing phase. For recognition of particular patterns (e.g. fall and ADLs), the machine learning based methods train a model based on the training data set containing target patterns, prior to use machine learning based classifiers in practice.

Figure 1:
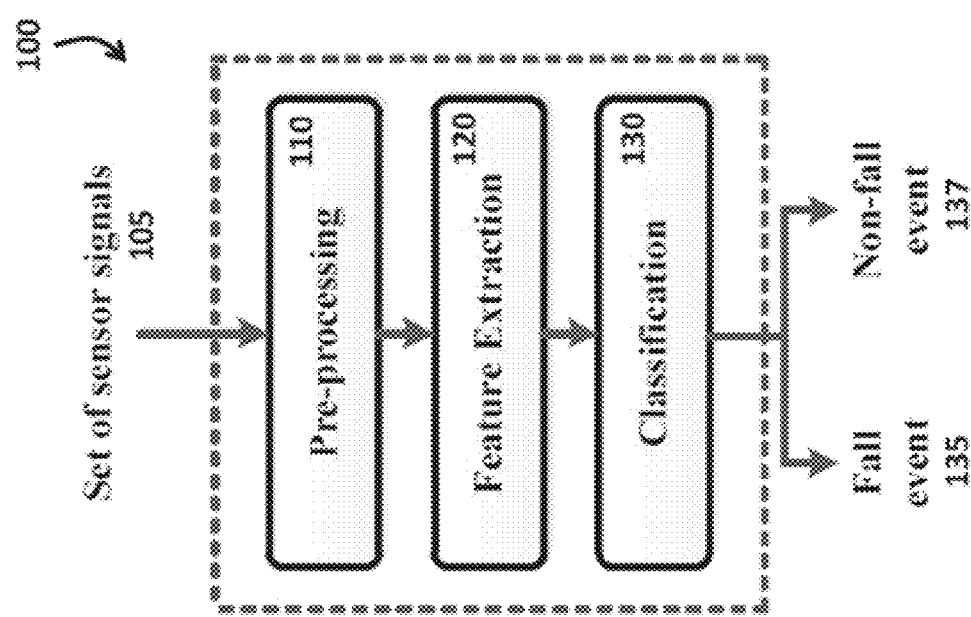
FIG. 1 illustrates, in a flow diagram, a method for detecting a fall event, in accordance with embodiments.

FIG. 1 illustrates, in a flow diagram, an overall view of a method for detecting a fall event, in accordance with embodiments of the present disclosure. Referring to FIG. 1, the method 100 may include three general steps of pre-processing 110, feature extraction 120, and classification 130.

At step 110, a set of sensor signals received 105 may be pre-processed in preparation of the feature extraction 120. For example, signal noise and spikes of the signals are removed from the set of sensor signals 105 using a well-designed low pass filter or moving average filter with an appropriate window size. Other pre-processing operations, such as normalization, filtering operations, etc., can be also applied to the set of sensor signals 105 before performing the step of feature extraction 120.

Once the sensor signals 105 are pre-processed, the step of feature extraction 120 may be performed. In various embodiments, 'feature' may refer to a property or characteristic of an observed phenomenon or event that can be individually measured. The feature extraction 120 may be an important step in the machine learning based fall detection method as the employed features may directly influence performance of the classification phase 130.

According to embodiments, sample signals may be analyzed in relation to time, frequency and time-frequency domains. Based on the analysis of the same signals, one or more selected features may be extracted from the data for a fixed length of time or a certain number of samples of data. The extraction of one or more selected features (i.e. feature extraction 120) may be performed after a signal windowing and segmentation process.

According to embodiments, the features used in the fall detection can be subsets of the initial raw data measured by the sensors. The more compact features are statistics of the raw data, such as mean, variance, maximum, momentum, etc. The raw data may also be transformed into the frequency domain before statistical manipulation.

According to embodiments, 'feature selection' may refer to a process applied to data indicative of the extracted feature. A subset of data indicative of the extracted feature is selected by during the 'feature selection' process such that more effective features are included in the selected data subset. The selected data subset may be used for development of the machine learning based method for fall detection.

In various embodiments, the feature selection techniques may be categorized into multiple groups including but not limited to filtered, wrapped, and embedded methods. Such feature selection techniques may be used to enhance the efficiency and robustness of the learning based classifiers. The feature selection process may decrease the dimensionality of the extracted feature set by removing one or more features that are less contributive and effective for accurate fall detection. In some embodiments, the feature selection process may be performed using one or more methods including but not limited to principal component analysis (PCA), linear discriminant analysis (LDA), and autoregressive models.

Further referring to FIG. 1, the step of classification 130 may follow the feature extraction 120. The classification 130 enables for determining if received set of signals are as a result of a fall event 135 or non-fall event 137. According to embodiments, a support vector machine (SVM) classification method may be used for implementation of the classification 130. The SVM classification method may classify a detected event into a fall event 135 or a non-fall event 137 (e.g. ADLs). The SVM classification method may detect fall events 135 in high accuracy without requiring an excessive amount of complex computations. According to embodiments, the SVM classification may substantially simplify implementation of the fall detection method on microprocessors, such as a wearable microcontroller processor or processors for mobile or wearable devices. According to embodiments, the SVM classification can be customized and fine-tuned in order to meet specific requirements of fall detection. It will be readily understood that while the instant disclosure primarily describes the support vector machine classification method in detail, other classification methods can be used or implemented such that these other classification methods can provide at least in part the desired level of classification of the data in order to determine a fall event or non-fall event. Some examples of other machine learning based techniques or methods that can be used to classify or assist classifying a detected event into a fall event 135 or a non-fall event 137 (e.g. ADLs) include K-Nearest Neighbor (KNN), Neural Networks (e.g. MLP, CNN, RNN), logistic regression, Naïve Bayes, and decision tree among other methods that would be readily understood by a worker skilled in the art. It is therefore considered that the SVM classification method is merely an example and that other classification methods would be readily understood by a worker skilled in the art. It may be further considered that while several techniques and methods are available for fall event detection, at least in some embodiments, SVM is a desired technique or primary technique for detecting fall events as it can achieve not only high accuracy but also low computational complexity, compared to the other machine learning based techniques.

Further information about KNN, neural networks, logistic regression, Naïve Bayes, and decision tree can be further discussed elsewhere herein. Further information for the SVM will be also provided below and can be define with respect to embodiments of the present disclosure.

K-Nearest Neighbor (KNN)

KNN method is one of the simplest classification methods, and also one of the most commonly used learning methods. KNN can use a database including different activities, in which the data points are divided into fall and non-fall classes, to predict the classification of a new sample point. K KNN is a non-parametric method therefore it does not make any assumptions on the underlying data distribution.

KNN is also a lazy learning method (as opposed to an eager method) therefore it does not use the training data points to do any generalization. In other words, there is no explicit training phase. Even if there is a training phase, the training phase of KNN would be very minimal and thus can be quick. Lack of generalization can indicate that KNN keeps all of the training data. To be more exact, all (or almost all) of the training data may be needed during the training phase for fall detection.

Hence, in KNN, a received data related to a specific activity is classified by a majority vote of its neighbors including fall and non-fall points, with the data being assigned to the class most common among its k nearest neighbors.

Logistic Regression

The idea of logistic regression is to find a relationship between features and probability of particular outcome. For instance, when it is required to predict whether an activity is fall or non-fall, when the peak of SMV in a window is given as a feature, the response variable has two values, fall and non-fall. This type of statistical method is referred to as binomial logistic regression, where the response variable has only two values '0 and 1' or 'true and false'. So, logistic regression predicts the probability of an outcome that can only have two values. The prediction is based on the use of one or several predictors.

As opposed to logistic regression, linear regression is not appropriate for predicting the value of a binary variable for at least the following reasons. A linear regression will predict values outside the acceptable range (e.g. predicting probabilities outside the range 0 to 1) and since experiments can only have one of two possible values for each experiment, the residuals are typically not normally distributed about the predicted line.

On the other hand, a logistic regression produces a logistic curve, which is limited to values between 0 and 1. Logistic regression is similar to a linear regression, but the curve is constructed using the natural logarithm of the "odds" of the target variable, rather than the probability. Moreover, the predictors may not be required to be normally distributed or have equal variance in each group.

Naïve Bayes

A method based on Naïve Bayes classifiers are a family of "probabilistic classifiers" based on Bayes' theorem with independence assumptions between the features. Naïve Bayes classifiers are scalable, requiring a number of parameters be linear in the number of variables (features/predictors) in a learning problem. Maximum-likelihood training can be done by evaluating a closed-form expression, which takes linear time, rather than by iterative approximation as used for many other types of classifiers. Naïve Bayes can discriminate not only linearly separable data associated with fall and non-fall events, but also non-linearly separable data associated with fall and non-fall events (e.g. data that are not linearly separable).

Decision Tree

Decision tree learning method uses a decision tree to go from observations about an item (represented in the branches) to conclusions about the item's target value (represented in the leaves). It is one of the predictive method approaches used in statistics, data mining and machine learning.

Tree models where the target variable can take a discrete set of values are called classification trees. In these tree structures, leaves represent class labels and branches represent conjunctions of features that lead to those class labels including fall and non-fall event. Decision trees where the target variable can take continuous values (typically real numbers) are called regression trees.

In decision analysis, a decision tree can be used to visually and explicitly represent decisions and decision making. In data mining, a decision tree describes data (but the resulting classification tree can be an input for decision making).

Fall Detection Based on Support Vector Machine (SVM)

SVM is a set of supervised machine learning methods used for classification and regression. SVM is a member of generalized linear classifiers, which try to maximize prediction accuracy and avoid over-fitting to a particular set of data. SVM may also be regarded as a method that uses hypothesis space of a linear function in a high dimensional feature space. SVM results in accuracy comparable to sophisticated neural networks with sophisticated features in a handwriting recognition task. SVM may be used not only for fall detection devices but also for other apparatuses, for example devices for hand writing analysis, face recognition, and speech detection.

SVM is a learning method that provides a general framework for studying the problem of making predictions from a set of input data. Learning theory enables choosing a right hyper-space that represents an underlying function in the target space. In learning theory, the problem of the supervised learning may exist. For instance, given a set of training data and a loss function (e.g. hinge loss function), a problem may exist in respect of finding a function that minimizes prediction errors on test data. As such, a model from the hypothesis space, which is closest to the true function in the target space, may be desired.

SVM model generalization refers to a machine learning model's ability to properly adapt (e.g. correctly classify) to new data that is previously unseen by the model when the model was trained (e.g. data that are not included in the training set). The SVM may provide better performances in model generalization than neural networks. Generally, as the more the machine learning algorithm learns (e.g. the higher the model complexity), the less error occurs for the model on the training data. However, if the machine learning model is trained for too long, the error for the model on the training data may continue to decrease as the model is over-fitting. The relationship between the error and the model complexity is illustrated in FIG. 2. As illustrated in FIG. 2, the error for the model on the training data decreases as the model complexity increases up to an optimum model complexity point 200. However, errors start to increase after passing the optimum model complexity point 200.

A technical advantage of the SVM is ease of training. Also, the SVM does not encounter problems suffered by neural networks, such as local minima. Moreover, its generalization to higher dimensions provides low generalization error, and the trade-off between complexity and generalization error can be explicitly controlled.

SVM may provide improved performance over neural networks, for example a multilayer perceptron (MLP). An MLP network is a class of feedforward artificial neural network (ANN) and uses feedforward and recurrent networks. MLPs try to estimate a universal approximation of a continuous nonlinear function. There are some issues with training of MLPs. A challenging issue may be the existence of many local minima which avoid the training from being converged to the right weights. Another challenging issue would be a need to find the right number of neurons which may be needed for a particular learning task. A further issue is that a neural network may not result in a unique solution.

Figure 3:
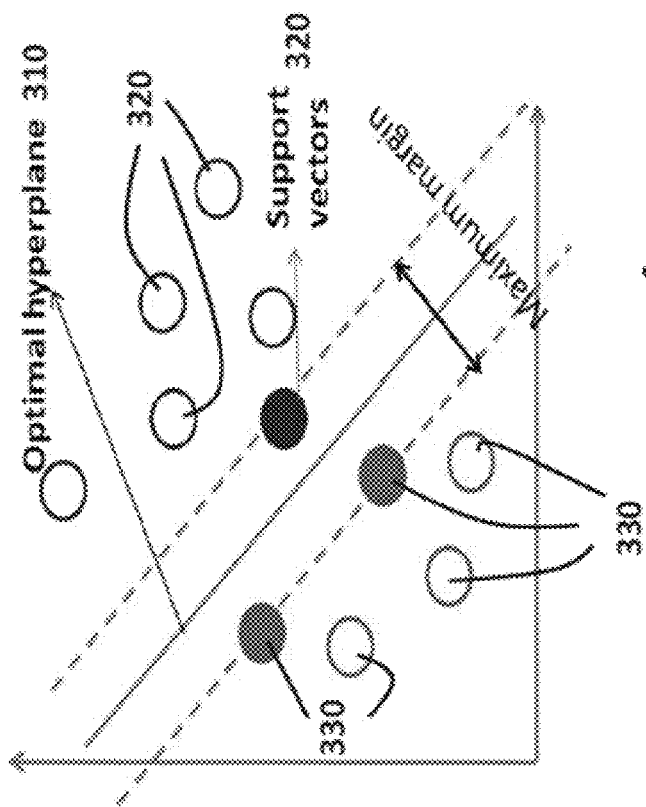
FIG. 3 illustrates a hyper-plane that optimally separates data points in two different classes with maximum margin.

SVM can provide a unique separating hyper-plane such that the classification error can be substantially minimized. SVM may separate data points with hyper-planes and also generalize their discriminative properties to nonlinearly separable data using techniques such as a kernel trick. If SVM training data is sufficient and adequately covers various situations, the trained hyper-plane can be obtained with a low generalization error. While there may be many hyper-planes that can classify data, the hyper-plane that represents the largest separation or maximum margin between two classes may be selected. FIG. 3 illustrates such a hyper-plane. As illustrated in FIG. 3, the optimal hyper-plane 310 classifies data points into two different classes while having a substantially maximum margin. For instance, the optimal hyper-plane 310 separates support vectors 320 in one class and support vectors 330 in another class, such that the distance from the optimal hyper-plane 310 to the nearest support vector (e.g. data point) on each side is substantially maximized.

In basic cases (e.g. soft-margin linear SVM), SVM classification can be illustrated by the following mathematical equation, with respect to substantially an optimization:

$$\min_{f, \xi_i} \|E\|^2 + C \sum_{i=1}^{N} \mu_i Y_i f(x_i) \geq 1 - \mu_i, \mu_i \geq 0, i = 1, 2, \ldots, N$$

where N is the number of training samples, E denotes the loss vector ($E_i$ is the error between predicted values($f(x_i)$) and the true label($Y_i$)), $\mu_i$ is a slack variable, and C is a tuning parameter selected empirically.

Kernel Trick

Figure 4:
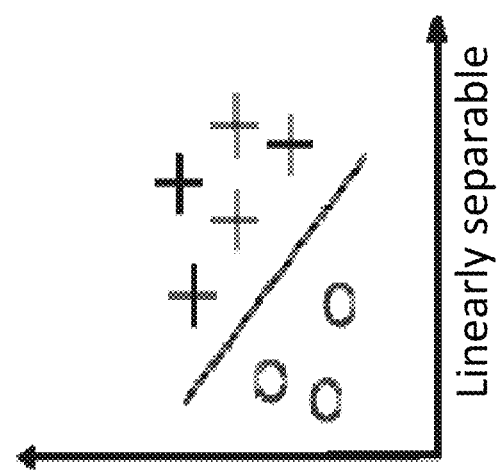
FIG. 4 illustrates a concept of the kernel trick according to embodiments.
Figure 4:
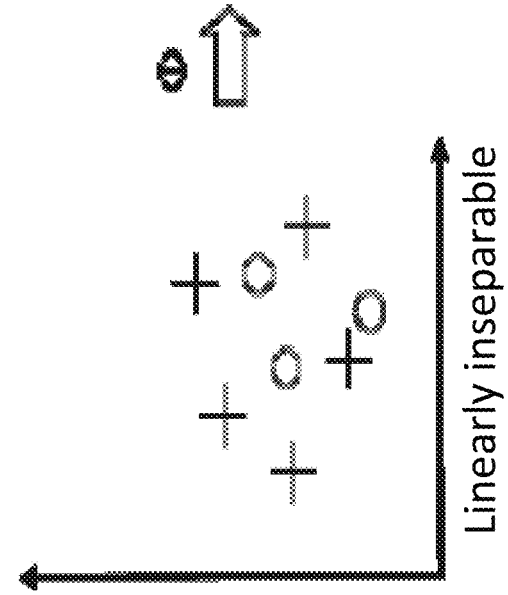

FIG. 4 illustrates the basic concept of a kernel trick. For cases where data points are not linearly separable, the substantial optimal separating hyper-plane would not be linear. Such cases may need to be handled differently, for example, by mapping input data to a high-dimensional space using a kernel function. Using a kernel function, the mapped data can be linearly separable in the higher-dimensional space. This mapping can be defined by the Kernel as follows:

$$K(x,y)=\Phi(x) \cdot \Phi(y)$$

The mapping may also transform the dot product in the original space to the dot product in the kernel space as follows:

$$x_1 \cdot x_2 \leftarrow K(x_1,x_2)=\Phi(x_1),\Phi(x_2)$$

Using kernel functions, SVM related operations can be performed in the input space instead of elaborating high-dimensional space. In practice, as the data may not be linearly separable, the kernel functions play a role in the generalization of SVMs. The kernel functions that can be used for the above can include but not limited to: polynomial kernel (in form of a polynomial function of input data), Gaussian kernel (in the form of a Gaussian function of the input data), and exponential kernel (in the form of exponent of the input data). A suitable kernel function and the parameters therefor may be selected based on experiments and cross validation on the training data set.

SVM for Classification of Fall Activities

As noted above, SVM can provide a useful technique for fall detection (e.g. classifying data into a fall event and a non-fall event). When performing data classification, there are often cases wherein classifying data into a fall event and a non-fall even can be challenging. Each sample in the training set may contain one target value (either fall or non-fall) or a combination of them. A desired objective of the SVM method is to produce a model predicting falls and ADLs with a reasonable accuracy in the testing phase.

Evaluation Metrics

Once the fall detection model is generated using machine learning based methods, the generated model may be evaluated prior to use in a practical application. For instance, statistical evaluations may be performed to determine the overall performance of the determined machine learning based classification methods. Many evaluation methods can perform evaluations using one or more indicators including sensitivity, specificity, accuracy, precision, $F_1$-measure values, and receiver operating characteristic (ROC) curve. The metrics equations can be defined based on parameters including but not limited to the following possible outcomes generated by the classification model:

True Positive (TP)—positive instances that were correctly labeled as positive;

False Positive (FP)—negative instances that were incorrectly labeled as positive;

True Negative (TN)—negative instances that were correctly labeled as negative; and False Negative (FN)—positive instances that were incorrectly labeled as negative.

Further information regarding parameters used for evaluation is provided below.

Sensitivity (SE) or Recall (RE) can indicate the ability of the fall detection system to accurately recognize fall events over the entire set of fall instances. SE can be calculated as follows:

$$SE = \frac{TP}{TP + FN}$$

Specificity (SP) measures the ability of the system to correctly identify ADL events over the entire set of ADL instances. SP can be calculated as follows:

$$SP = \frac{TN}{TN + FP}$$

Accuracy (AC) is an indicator used for performance evaluation of the classification problems. AC can be calculated as follows:

$$AC = \frac{TP + TN}{TP + FP + TN + FN}$$

Precision (PR) or positive predicted value refers to the proportion of the number of correctly classified fall instances to the entire set of the instances classified as falls. PR can be calculated as follow:

$$PR = \frac{TP}{TP + FP}$$

False Positive Rate (FPR) or Fall-out refers to a ratio of the instances incorrectly classified as falls over the entire set of ADL instances. FRP can be calculated as follows:

$$FPR = \frac{FP}{TN + FP} = 1 - SP$$

$F_1$-measure refers to a measure of test accuracy which can be based on a combination of the precision and sensitivity indicators. $F_1$-measure can be calculated as follows:

$$F1\text{-measure} = \frac{2.SE.PR}{SE + PR}$$

Method Flow

Figure 5:
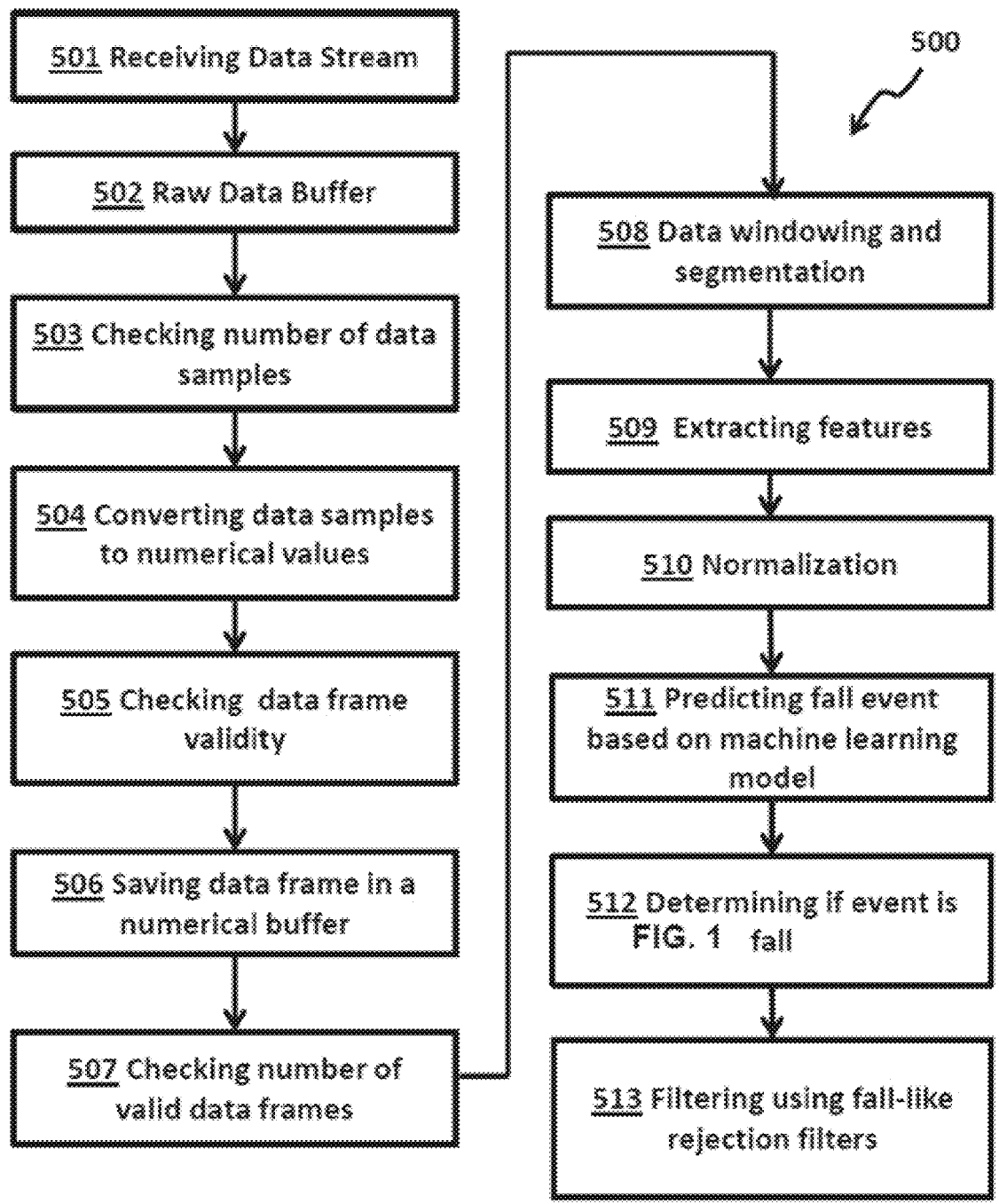
FIG. 5 illustrates, in a flow diagram, a method for detecting a fall event, in accordance with embodiments.

FIG. 5 illustrates, in a flow diagram, detailed steps of a method for detecting a fall event, in accordance with embodiments of the present disclosure. According to embodiments, the method 500 may be configured based on machine learning based method and may be used in mobile devices like a pendant device or other wearable device that is used for fall detection.

Referring to FIG. 5, at step 501, the data stream may be received in the form of a pre-determined scheme. The format may be based on a character-encoding scheme like ASCII (American Standard Code for Information Interchange) codes. At step 502, the received data stream may be saved in a raw data buffer. The data stream may be received and saved until enough data samples are collected. In various embodiments, the data stream may be saved in the raw data buffer until the collected data sample (e.g. data sample in ASCII code) exceeds a predetermined number of samples (e.g. $L_{max}^{ASCII}$). The data samples in ASCII codes may be, at step 504, converted to their corresponding numerical values. At step 504, data frames may also be detected. At step 505, whether the data frames detected at step 504 are valid may be examined. Invalid data frames may be ignored. At step 506, the valid data frames may be saved in a numerical buffer until there are sufficient valid data frames to be processed. If, at step 507, the number of valid data frames exceeds a predetermined number of data frames (e.g. $L_{max}^{numeric}$), the data windows may be extracted through a data windowing and segmentation process at step 508.

Figure 6:
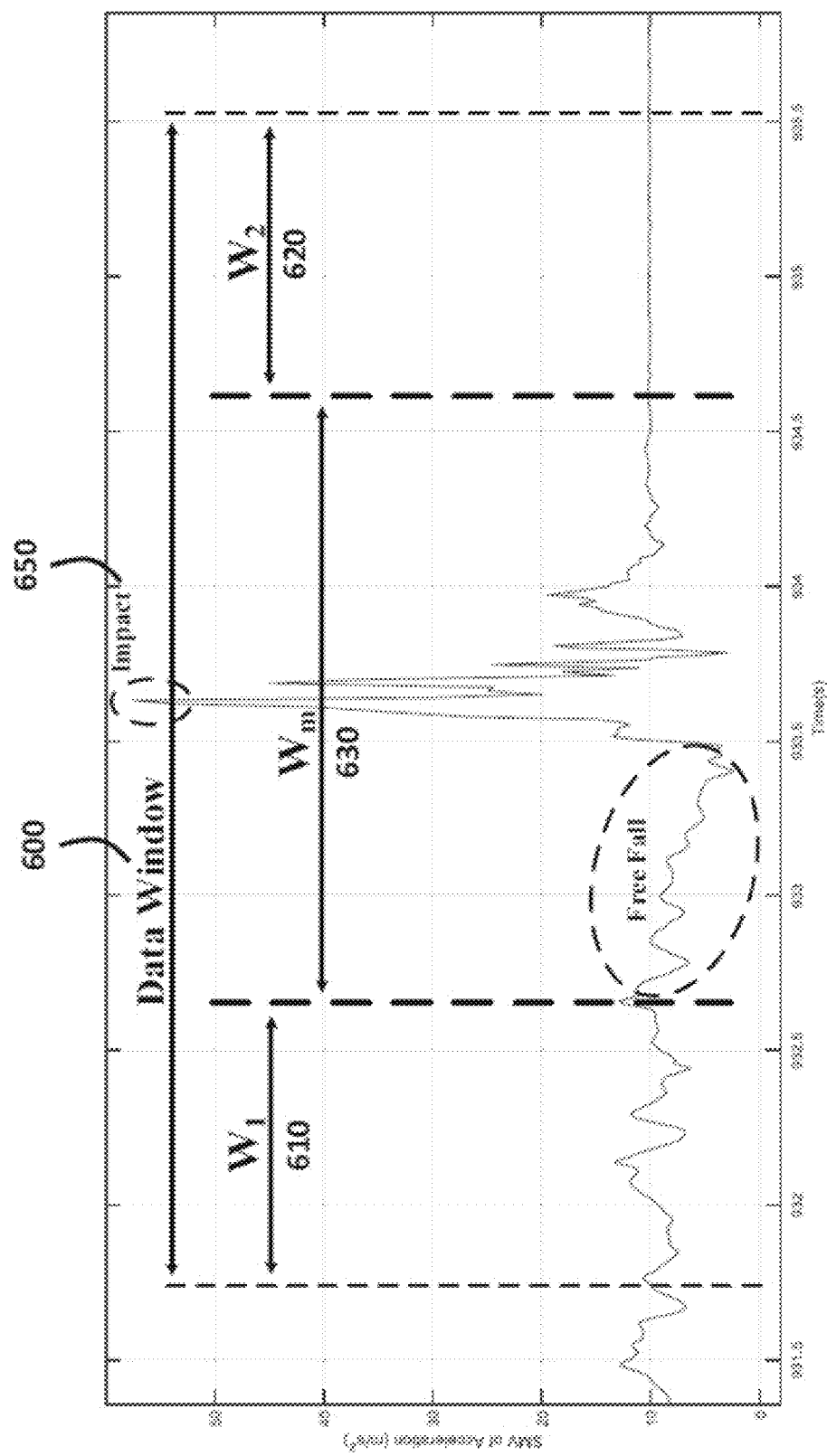
FIG. 6 illustrates an example of the data windowing and segmentation process applied to signal magnitude vector (SMV) of acceleration for a typical fall event, in accordance with embodiments.

The data windowing and segmentation process 508 is further illustrated in FIG. 6 which illustrates an example of the data windowing and segmentation process 508 applied to signal magnitude vector (SMV) of acceleration, in accordance with embodiments of the present disclosure. The data windowing and segmentation process 508 may be employed into the fall event detection methods. The waveform presented in FIG. 6 may be related to signal magnitude vector (SMV) of acceleration related to a typical fall event, received from a fall detection apparatus, such as a fall detection wearable device (e.g. fall detection pendant or wrist device).

According to embodiments, during the data windowing and segmentation process 508, the received data samples may be distributed to a plurality of time windows with a pre-defined size. In some embodiments, a suitable size of the time windows may be determined based on SMV of acceleration data associated with numerous fall events with various fall patterns (e.g. 400 or more fall events originated from 20 or more individuals). As illustrated in FIG. 6, the data window 600 may be divided to three sub-windows comprising the sub-window $W_1$ 610 indicative of pre-fall (or pre-impact) moment, the sub-window $W_2$ 620 indicative of post-fall moment and the main window $W_m$ 630 indicative of fall moment. The data in the three optimized sub-windows may be used for extracting information with regards to pre-fall (or pre-impact) moment, fall moment, and post-fall moment, respectively. Each of sub-window $W_1$ 610 and sub-window $W_2$ 620 may have a length of 100 samples (e.g. 1 second), and the main window $W_m$ 630 may have length of 200 samples (e.g. 2 seconds).

Further referring to FIG. 5, after the data windowing and segmentation process 508, various types of information may be concurrently extracted, at step 509, from the sub-windows (e.g. three optimized sub-windows 610, 620 and 630). The feature extraction 509 may be categorized into several feature extraction types, for example accelerometer-based feature extraction, gyroscope-based feature extraction, barometric pressure-based feature extraction or other sensor-based feature extraction.

Figure 7:
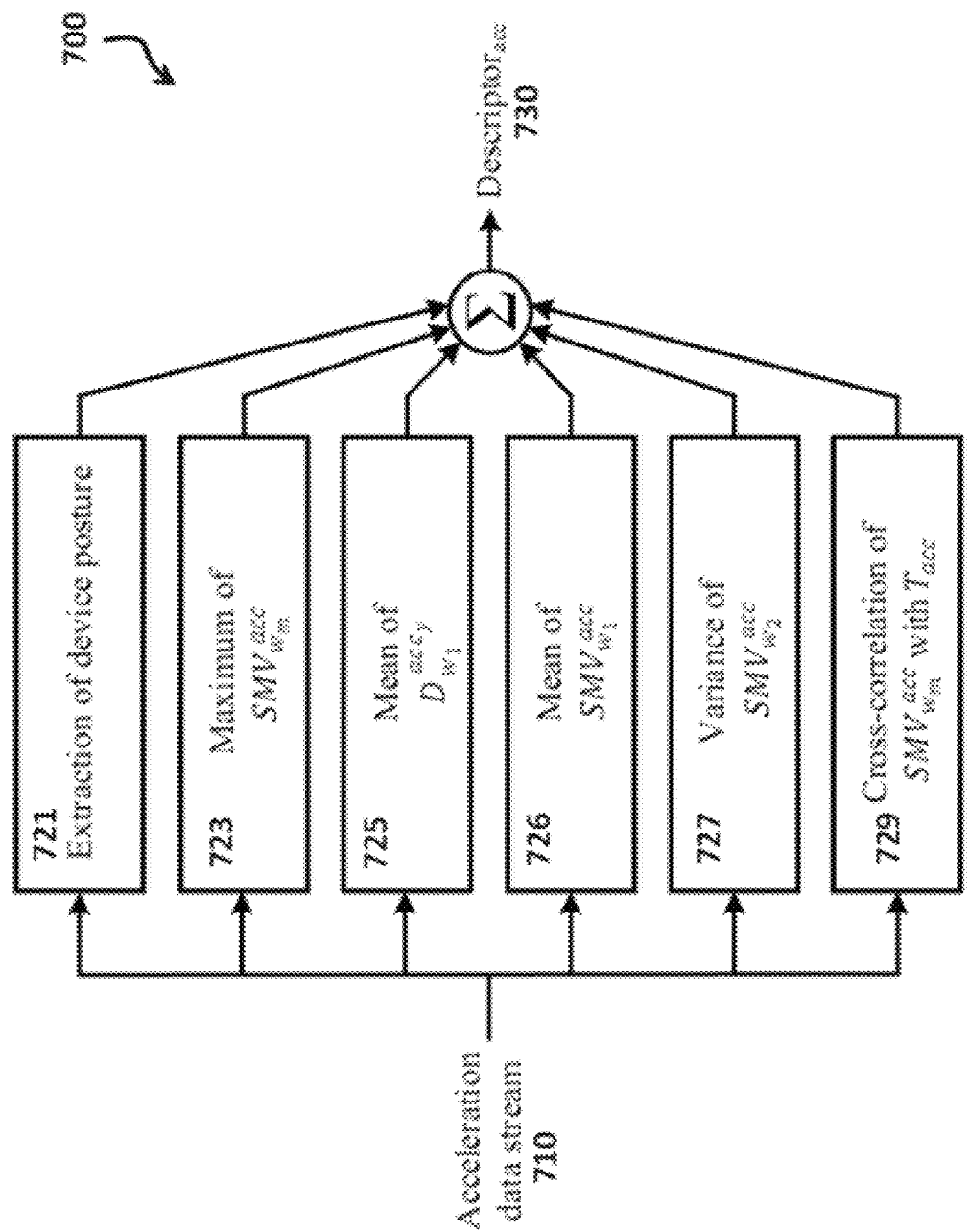
FIG. 7 illustrates, in a block diagram, an example of a process for accelerometer-based feature extraction, in accordance with embodiments.

FIG. 7 illustrates an example of the process of the accelerometer-based feature extraction 700, in accordance with embodiments of the present disclosure. The accelerometer-based feature extraction 700 may comprise one or more sub-processes extracting features based on acceleration data. Such feature extraction sub-processes may be associated with one or more of device posture 721, maximum of $SMV_{w_m}^{acc}$ 723, mean of $D_{W_1}^{acc_y}$ 725, mean of $SMV_{w_1}^{acc}$ 726, variance of $D_{W_2}^{acc}$ 727, and cross-correlation of $SMV_{w_m}^{acc}$ with $T_{acc}$ 729. According to embodiments, the acceleration data stream 710 may be forwarded to each feature extraction sub-process of the accelerometer-based feature extraction 700. Each output of the feature extraction sub-processes may be aggregated, integrated and combined together, and forwarded to the accelerometer sensor descriptor 730.

The feature extraction sub-process associated with device posture 721 may be configured to calculate the changes in human posture and a fall detection device's orientation (or a fall detection device's direction). This sub-process may use data in two sub-windows from the data windowing and segmentation process 508 in order to detect changes in the subject's posture, orientation or direction. For instance, the fall detection device's orientation or direction is extracted as a fall detection feature based on the data in two sub-windows. In some embodiments, the data in two sub-windows may include tri-axial accelerometer data in the sub-windows for pre-fall (or pre-impact) moment and post-fall moment. The feature related to device posture 721 may be extracted by comparing acceleration before and after fall events according to the following equation:

$$f_{dir} = \sum_{i \in \{x,y,z\}} |D_{W_2}^{acc_i} - D_{W_1}^{acc_i}|$$

Figure 8:
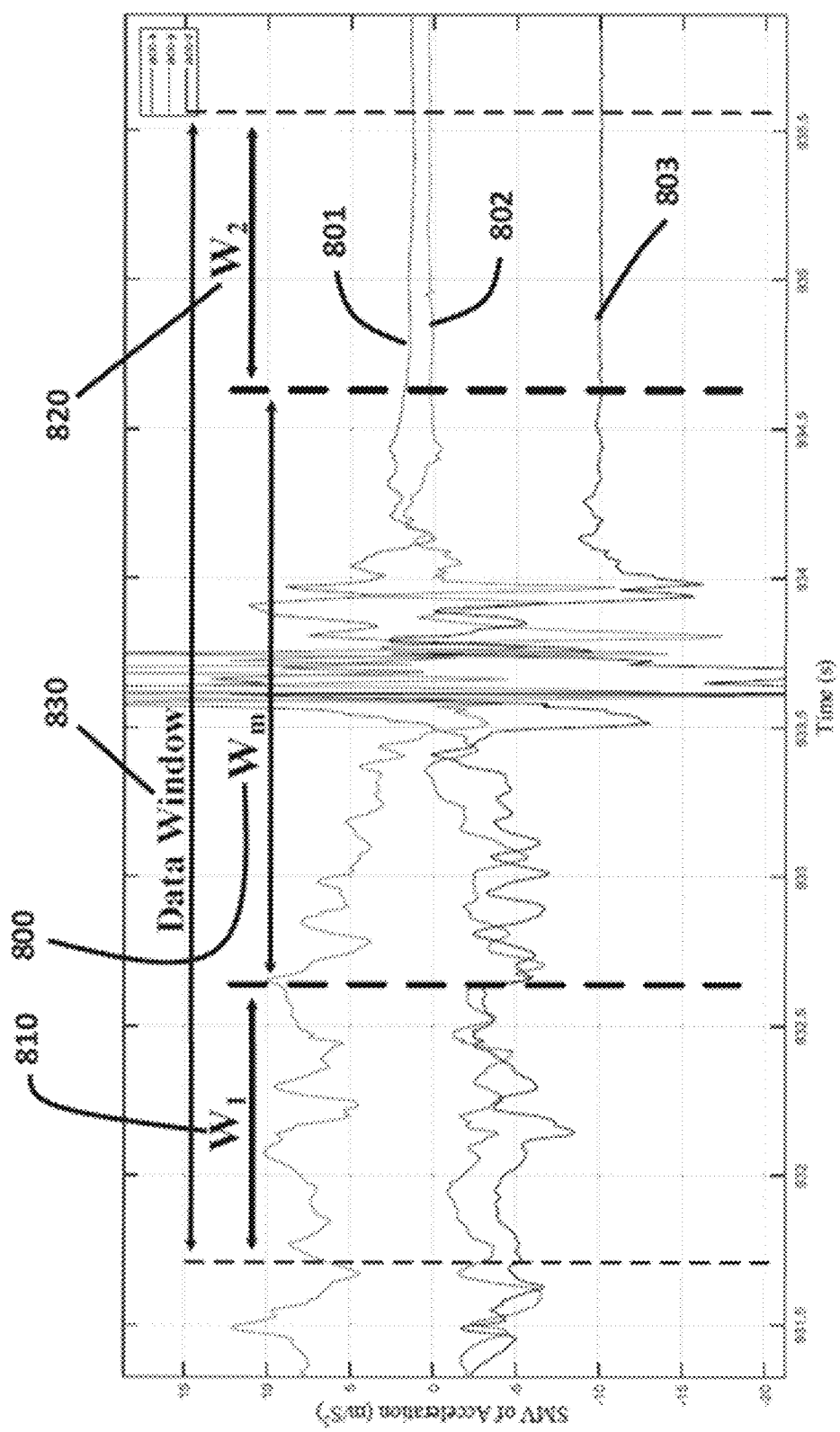
FIG. 8 illustrates an example data window representing changes in the values of acceleration data in x, y and z axes during a typical fall event.

According to embodiments, the feature extraction sub-process associated with device posture 721 may be considered to have a low computational complexity. FIG. 8 illustrates an example data window representing changes in the values of acceleration data (e.g. SMV of acceleration) in x, y and z axes during a typical fall event. The acceleration data in x, y and z axes can be identified as acc-x 801, acc-y 802 and acc-z 803 in FIG. 8. Referring to FIG. 8, the data window 800 is divided into three sub-windows comprising sub-window $W_1$ 810 indicative of pre-fall (or pre-impact) moment, sub-window $W_2$ 820 indicative of post-fall moment and main window $W_m$ 830 indicative of fall moment. Each of sub-window $W_1$ 810 and sub-window $W_2$ 820 may have a length of 100 samples (e.g. 1 second) and main window $W_m$ 830 may have length of 200 samples (e.g. 2 seconds).

The feature extraction sub-process associated with maximum of $SMV_{w_m}^{acc}$ 723 may be related to maximum acceleration of the fall detection device. This sub-process may calculate the maximum value for SMV of acceleration, based on the data obtained from the main window ($SMV_{w_m}^{acc}$ 723). For instance, the peak values of magnitude of the axial accelerometer data in the sub-window indicative of moment of (physical) impact (e.g. fall moment) may be extracted as a fall detection feature. Due to the (physical) impact occurring during a fall event, the maximum value of accelerometer SMV of a fall event may be relatively higher than that of ADLs. The maximum value for SMV of acceleration may be computed as follows:

$$f_{max_{acc}} = \max\left(SMV_{w_m}^{acc}\right)$$
$$= \max\left(\sqrt{(D_{W_m}^{acc_x})^2 + (D_{W_m}^{acc_y})^2 + (D_{W_m}^{acc_z})^2}\right)$$

The feature extraction sub-process associated with mean of $D_{W_1}^{acc_y}$ 725 may be related to the vertical alignment of the fall detection device (e.g. fall detection wearable device). This sub-process may calculate the vertical acceleration of the fall detection device to detect vertical alignment of the fall detection device. The (vertical) acceleration data in the sub-window indicative of pre-fall (or pre-impact) moment may be extracted as a feature for detection of vertical alignment of the fall detection device. The vertical acceleration of the fall detection device may be calculated based on y-axis acceleration data in sub-window $W_1$ (e.g. sub-window $W_1$ 810). When the fall detection device is vertically aligned (e.g. in a substantially vertical condition substantially without tilt), the y-axis acceleration may be approximately equal to the gravitational acceleration (e.g. free fall acceleration of an object in vacuum) whereas the values of the x-axis acceleration and the z-axis acceleration may be approximately zero. The vertical acceleration of the fall detection device may be calculated as follows:

$$f_{acc_{vertical}} = \left|E[D_{W_1}^{acc_y}]\right|$$
$$= \left|\frac{1}{L_{w_1}} \sum_{i=1}^{L_{W_1}} D_{W_1}^{acc_y}(i)\right|$$

The feature extraction sub-process associated with mean of $SMV_{w_1}^{acc}$ 726 may calculate the average value of acceleration SMV in sub-window indicative of pre-fall (or pre-impact) moment. Through this feature, useful information related to the average acceleration of free-fall part during a fall event can be extracted to be used in fall detection method. In various embodiments, this feature can operate in a manner that the value of the feature is decreasing as severity of a fall incident increases (e.g. the more severe a fall incident, the less value of the feature). The average acceleration SMV during free-fall part may be computed as follows:

$$f_{acc_{free-fall}} = E[SMV_{W_1}^{acc}]$$
$$= \frac{1}{L_{w_1}} \sum_{i=1}^{L_{W_1}} \sqrt{(D_{W_1}^{acc_x}(i))^2 + (D_{W_1}^{acc_y}(i))^2 + (D_{W_1}^{acc_z}(i))^2}$$

The feature extraction sub-process associated with variance of $D_{W_2}^{acc}$ 727 may be related to variance for acceleration of the fall detection device. This sub-process may calculate the variance value of SMV of acceleration data in sub-window $W_2$ (e.g. sub-window $W_2$ 820). The variation in acceleration data in the sub-window indicative of post-fall moment may be extracted as a feature for detection of the subject's post-fall momentary inactivity. Evaluating the variance value of SMV of acceleration data may be beneficial for detecting a fall event because there is usually a rest time (e.g. period when the subject is inactive), after the moment of impact occurred during a fall event, in which the variation in SMV of $D_{W_2}^{acc}$ is relatively low. The variance for acceleration of the fall detection device may be calculated as follows:

$$f_{var-acc} = E[(D_{W_2}^{acc})^2] - (E[D_{W_2}^{acc}])^2$$
$$= \frac{1}{L_{w_2}} \sum_{i=1}^{L_{W_2}} (D_{W_2}^{acc}(i))^2 - \left(\frac{1}{L_{w_2}} \sum_{i=1}^{L_{W_2}} D_{W_2}^{acc}(i)\right)^2$$

The feature extraction sub-process associated with cross-correlation of $SMV_{w_m}^{acc}$ and $T_{acc}$ 729 may provide a measure of similarity between the acceleration waveform measured by the fall detection device and the predefined acceleration values that are indicative of fall events. Through this sub-process, the cross-correlation of acceleration data of the window ($SMV_{w_m}^{acc}$) and the acceleration data of a pre-defined template ($T_{acc}$) constructed from numerous real world data (e.g. data collected from previous events) may be extracted as features for detecting patterns related to fall events. The patterns may be associated with pre-fall (pre-impact) moment, fall (impact) moment and post-fall moment. In various embodiments, the similarity may be calculated between the acceleration SMV for different activities and an acceleration value in pre-defined fall template. The pre-defined fall template may be obtained by averaging a number of different fall events (e.g. 20 or more different fall events), each of which may be performed by a different subject. The maximum value of cross-correlation of $SMV_{w_m}^{acc}$ and $T_{acc}$ 729 may be calculated as follows:

$$f_{corr-acc}(\tau) = \max\left(SMV_{w_m}^{acc}(t) \otimes T_{acc}(t)\right)$$
$$= \max\left(E\{SMV_{w_m}^{acc}(t) \cdot T_{acc}(t+\tau)\}\right)$$
$$= \max\left(\int_{-\infty}^{+\infty} SMV_{w_m}^{acc}(t) \cdot T_{acc}(t+\tau) dt\right)$$

where $T_{acc}$ is the pre-defined acceleration based fall template.

Figure 9:
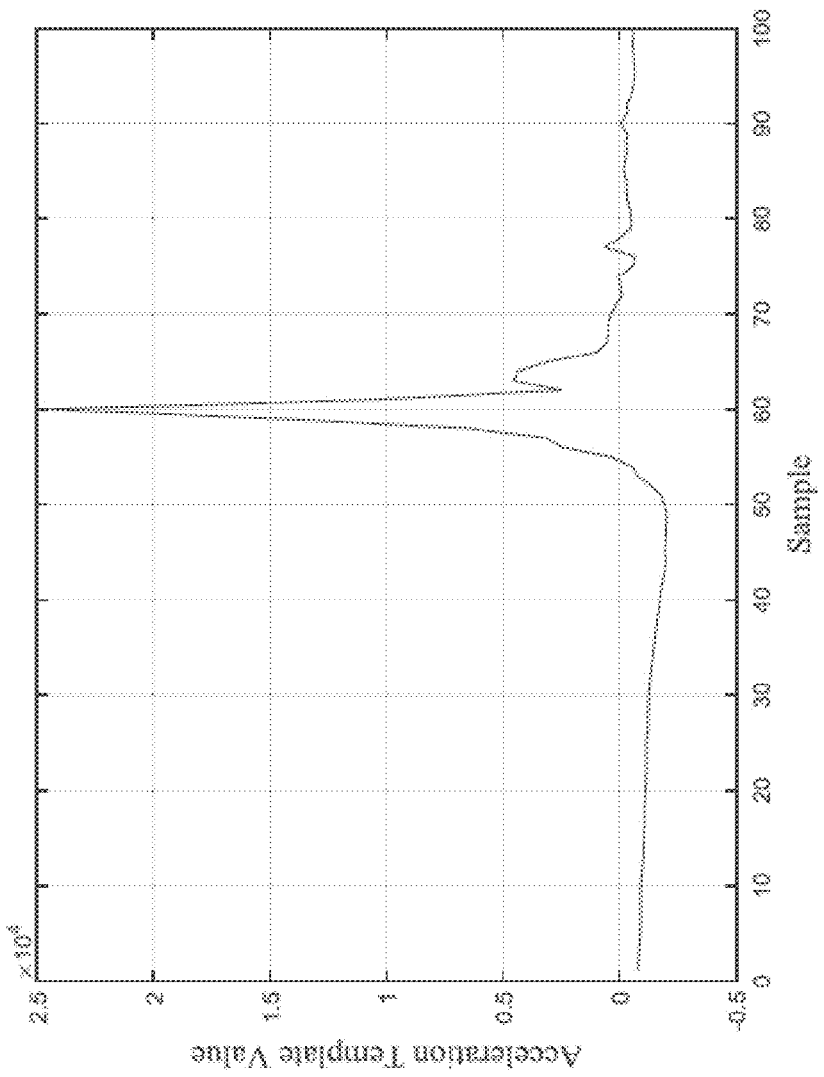
FIG. 9 illustrates an example of a pre-defined acceleration-based fall template obtained based on acceleration SMV, in accordance with embodiments.

FIG. 9 illustrates an example of pre-defined acceleration-based fall template obtained based on acceleration SMV, in accordance with embodiments of the present disclosure. Referring to FIG. 9, the length of the acceleration value pre-defined in the fall template is 100 samples. The 100 samples of acceleration value include 60 samples associated with the pre-impact (pre-fall) moment and 40 samples associated with post-impact (post-fall) moment.

Referring to the mathematical equation shown above, in order to measure the cross-correlation of the measured acceleration and the predefined acceleration values, the cross-correlation between the acceleration SMV in the main window ($SMV_{w_m}^{acc}$) and the acceleration value in the pre-defined template ($T_{acc}$) may be computed first. Then, the maximum value of the cross-correlation output may be regarded as the cross-correlation of the measured acceleration and the predefined acceleration values. The maximum value obtained may represent a measure of similarity between the acceleration waveform at the fall detection device (e.g. $SMV_{W_m}^{acc}$) and the predefined acceleration values for fall events (e.g. $T_{acc}$).

According to embodiments, while not illustrated in FIG. 7, the accelerometer-based feature extraction 700 may further include one or more sub-processes that enhance performance of the fall event detection method using acceleration-based features based on Fourier Transform. For instance, accuracy of the fall event detection method may be improved using the Fourier Transform based features, especially when only an acceleration sensor is used for detecting fall events. However, it may be noted the Fourier Transform based features may require capacity for high computational complexity.

In order to use Fourier Transform based features, beneficial information can be extracted from acceleration magnitude in frequency domain. To compute the values of the proposed features, SMV of acceleration data is first normalized through subtracting by the minimum value and dividing by the maximum value of the acceleration magnitude. Then, the Discrete Fourier Transform (DFT) of the normalized SMV of acceleration is calculated for the given data windows as follows:

$$F\{SMV_{w_t}^{acc}\} = \sum_{i=1}^{L_{W_t}} SMV_{w_t}^{acc}[i].e^{-\frac{j2\pi}{L_{W_t}}ki}$$

$$= \sum_{i=1}^{L_{W_t}} e^{-\frac{j2\pi}{L_{W_t}}ki} \sqrt{\left(D_{W_t}^{acc_x}(i)\right)^2 + \left(D_{W_t}^{acc_y}(i)\right)^2 + \left(D_{W_t}^{acc_z}(i)\right)^2}$$

where $SMV_{w_t}^{acc}$ denotes acceleration magnitude in the data window $W_t$. The data windows considered in this feature include:

$W_{t_1}=W_1$ (sub-window $W_1$)
$W_{t_2}=[W_1, W_m]$ (sub-window $W_1$ plus main window $W_m$)
$W_{t_3}=W_m$ (main window)
$W_{t_4}=W_2$ (sub-window $W_2$)

After that, the magnitude of four obtained N-point DFT of SMV of acceleration in the aforementioned data windows are computed, where N is related to the length of input data (N=$L_{W_t}$). The values of N for $W_{t_1}$, $W_{t_2}$, $W_{t_3}$, and $W_{t_4}$ are equal to 100, 300, 200, and 100, respectively. Then, the first half of the magnitude of each N-point DFT vector is used to find useful information in different frequency bands. The vector is down-sampled to M points, which is indicative of M-dimensional feature vector. The value of M is different for the DFT vectors obtained for various data windows. The optimum values of M for $W_{t_1}$, $W_{t_2}$, $W_{t_3}$, and $W_{t_4}$ are 5, 15, 10, and 5, respectively.

According to embodiments, while not illustrated in FIG. 7, further feature extraction sub-processes may be employed using a wavelet transform in order to analyze acceleration data in wavelet-domain. It is understood that wavelet transforms can provide useful information relative to the different frequency bands by providing temporal localization for frequency components. In some embodiments, different wavelet-based features have been analyzed to detect fall and non-fall events. According to some embodiments, a continuous wavelet transform (CWT) and a discrete wavelet transform (DWT) are applied to the SMV of acceleration of the received data window to transfer acceleration data to the wavelet domain. It is noted that wavelet transforms can involve computational complexity, therefore the use of wavelet transforms for computations can be dependent on the desired implementation. For example, the use of wavelet transforms in an implementation associated with a pendant device may not be appropriate.

According to some embodiments, for DWT, digital filters with different cutoff frequencies may be employed to analyze acceleration data in different scales. There are several high-pass filters to analyze the high frequencies and several low-pass filters to analyze the low frequencies. In some embodiments, a single-level 1-D wavelet transform can be used to determine the frequency band of the main spectral component of the input acceleration SMV. In this regard, after passing the received data through single level wavelet decomposition, two sets of coefficients are obtained including approximation coefficients and detail coefficients. According to some embodiments, the 1-level wavelet coefficients of the acceleration SMV may be determined as follows:

$$a_{detail}(i) = y_{high}(i) = SMV^{acc}(i) * g(i) = \sum_{k=-\infty}^{+\infty} SMV^{acc}(k)g(i-k)$$

$$a_{approx}(i) = y_{low}(i) = SMV^{acc}(i) * h(i) = \sum_{k=-\infty}^{+\infty} SMV^{acc}(k)h(i-k)$$

where $a_{detail}$ represents detail coefficients of acceleration SMV which is related to the output of the high-pass filter $g(i)$, and $a_{approx}$ represents approximation coefficients which is related to the output of the low-pass filter $h(i)$.

According to embodiments, the acceleration SMV of the received data window is first passed through the high-pass and low-pass filter. Then, the outputs of the both filters are subsampled by two. High-pass and low-pass filters are formed from the selected mother wavelet. Different wavelet functions such as Haar and Daubechies' wavelets may be used as the mother wavelet. In DWT, the resolution of the acceleration SMV can be changed by filtering operations and the scale can be changed by subsampling operations. The aforementioned equations denote discreet wavelet coefficients of the acceleration SMV at the first scale. After subsampling of the outputs, approximation coefficients may be used to compute $a_{detail}$ and $a_{approx}$ for the next scales.

According to embodiment continuous wavelet transform (CWT) may be use, wherein the similarity between SMV of acceleration of the received data window and different scales of the chosen mother wavelet can be computed. CWT of the acceleration SMV may be computed as follows:

$$CWT_{acc}^{\psi}(\tau, s) = \frac{1}{\sqrt{s}} \int_{-\infty}^{+\infty} SMV^{acc}(t)\psi^*\left(\frac{t-\tau}{s}\right)dt$$

where $\tau$ and $s$ denote translation and scale parameters, respectively. $\psi$ represents the mother wavelet.

According to embodiments, different mother wavelet including Haar and Daubechies' wavelets may be employed to compute the similarity between acceleration data and the mother wavelet. The mother wavelet may also be obtained by averaging acceleration SMV related to a predefined number of real-world fall incidents. For example, 25 real-world fall incidents may be considered.

Desired information may be extracted from time-scale (time-frequency) representation of the acceleration data, provided by wavelet coefficients, for fall and non-fall events. It is understood that both DWT and CWT can have high computational complexity of the wavelet-based features, and as such this configuration may not suitable for a wearable device in accordance with some embodiments.

Figure 10:
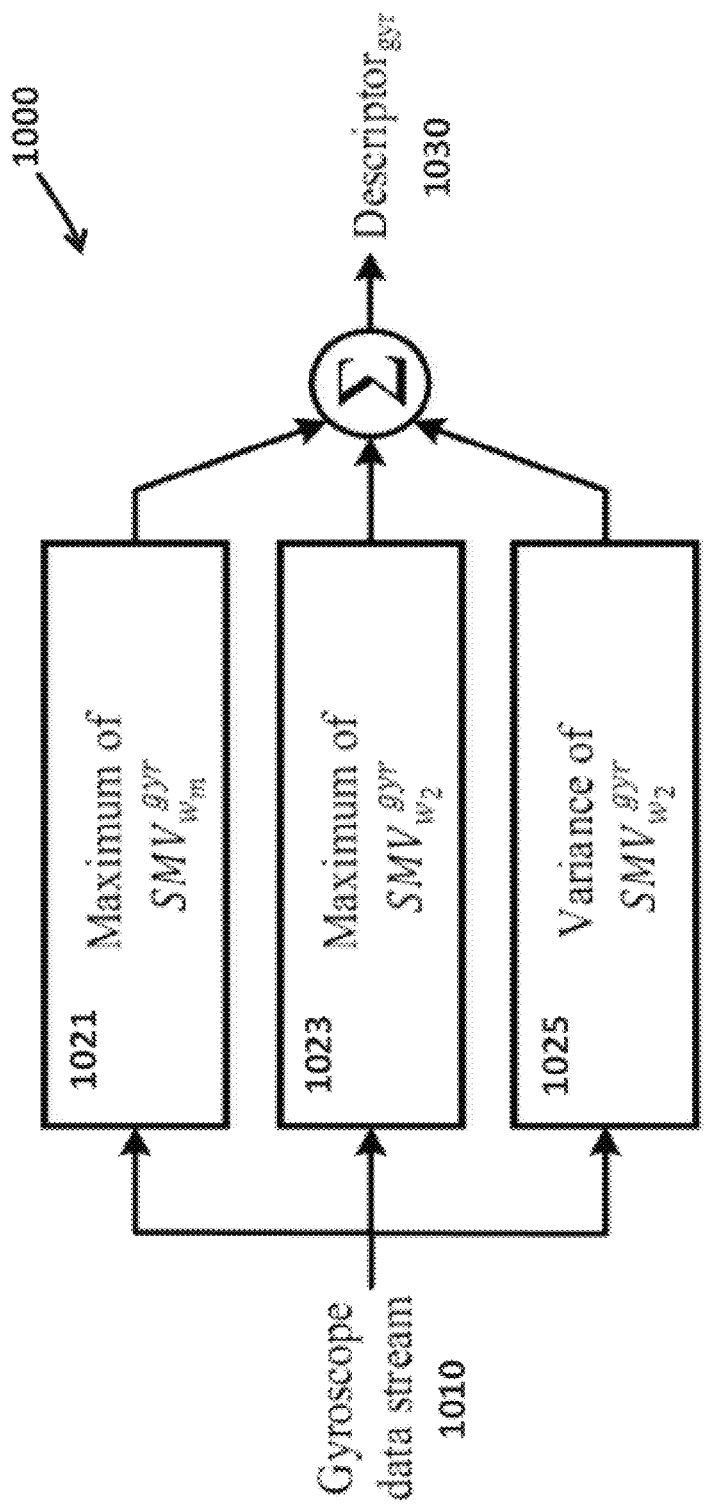
FIG. 10 illustrates, in a block diagram, an example of a process for gyroscope-based feature extraction, in accordance with embodiments.

FIG. 10 illustrates an example of the process of the gyroscope-based feature extraction 1000, in accordance with embodiments of the present disclosure. The gyroscope-based feature extraction 1000 may comprise one or more of sub-processes extracting features based on gyroscope data. Such feature extraction sub-processes may be associated with one or more of maximum of $SMV_{w_m}^{gyr}$ 1021, maximum of $SMV_{w_2}^{gyr}$ 1023, and variance of $SMV_{w_2}^{gyr}$ 1025. According to embodiments, the gyroscope data stream 1010 may be forwarded to each feature extraction sub-process of the gyroscope-based feature extraction 1000. Each output of the feature extraction sub-processes may be aggregated, integrated and combined together, and forwarded to the gyroscope sensor descriptor 1030.

The feature extraction sub-process associated with maximum of $SMV_{w_m}^{gyr}$ 1021 may be related to the maximum angular velocity of the fall detection device. This sub-process may calculate the maximum angular velocity of the fall detection device in the main window $W_m$ (e.g. main window $W_m$ 830) using the data received from gyroscope sensor (e.g. the gyroscope data stream 1010). For instance, the peak values of magnitude of the gyroscope data in the sub-window indicative of moment of (physical) impact (e.g. fall moment) may be extracted as a fall detection feature. The sub-process may be configured based on that fall events usually cause the subject (e.g. the fall detection device) to significantly rotate thereby triggering large increase in the value of gyroscope SMV. The maximum of $SMV_{w_m}^{gyr}$ 1021 may be calculated as follows:

$$f_{max_{gyr-w_m}} = \max\left(SMV_{w_m}^{gyr}\right)$$
$$= \max\left(\sqrt{(D_{W_m}^{gyr_x})^2 + (D_{W_m}^{gyr_y})^2 + (D_{W_m}^{gyr_z})^2}\right)$$

The feature extraction sub-process associated with maximum of $SMV_{w_2}^{gyr}$ 1023 may be related to the post-fall device inactivity. This sub-process may recognize the device inactivity after a fall or a fall-like event happened. According to embodiments, motionless status or immobility condition after fall event or fall-like event may be recognized based on angular velocity of the fall detection device. The data in post-fall sub-window $W_2$ (e.g. sub-window $W_2$ 820) may be used of this. In some embodiments, such immobility condition may be recognized based on maximum angular velocity of the fall detection device (e.g. maximum of $SMV_{w_2}^{gyr}$ 1023). The maximum of $SMV_{w_2}^{gyr}$ 1023 may be calculated as follows:

$$f_{max_{gyr-w_2}} = \max\left(SMV_{w_2}^{gyr}\right)$$
$$= \max\left(\sqrt{(D_{W_2}^{gyr_x})^2 + (D_{W_2}^{gyr_y})^2 + (D_{W_2}^{gyr_z})^2}\right)$$

The feature extraction sub-process associated with variance of $SMV_{w_2}^{gyr}$ 1025 may calculate the variation in gyroscope data in the sub-window indicative of post-fall moment for detection of the subject's post-fall momentary inactivity. Evaluating the variance value of SMV of gyroscope data (e.g. variance of $SMV_{w_2}^{gyr}$ 1025) may be beneficial for detecting a fall event because there is usually a rest time (e.g. period when the subject is inactive) after the moment of impact occurred during a fall event, in which the variation in SMV of $D_{W_2}^{gyr}$ is relatively low. The variance for angular velocity of the fall detection device in post-fall moment may be computed as follows:

$$f_{var-gyr} = E[(D_{W_2}^{gyr})^2] - (E[D_{W_2}^{gyr}])^2$$
$$= \frac{1}{L_{w_2}}\sum_{i=1}^{L_{W_2}}(D_{W_2}^{gyr}(i))^2 - \left(\frac{1}{L_{w_2}}\sum_{i=1}^{L_{W_2}}D_{W_2}^{gyr}(i)\right)^2$$

Figure 11:
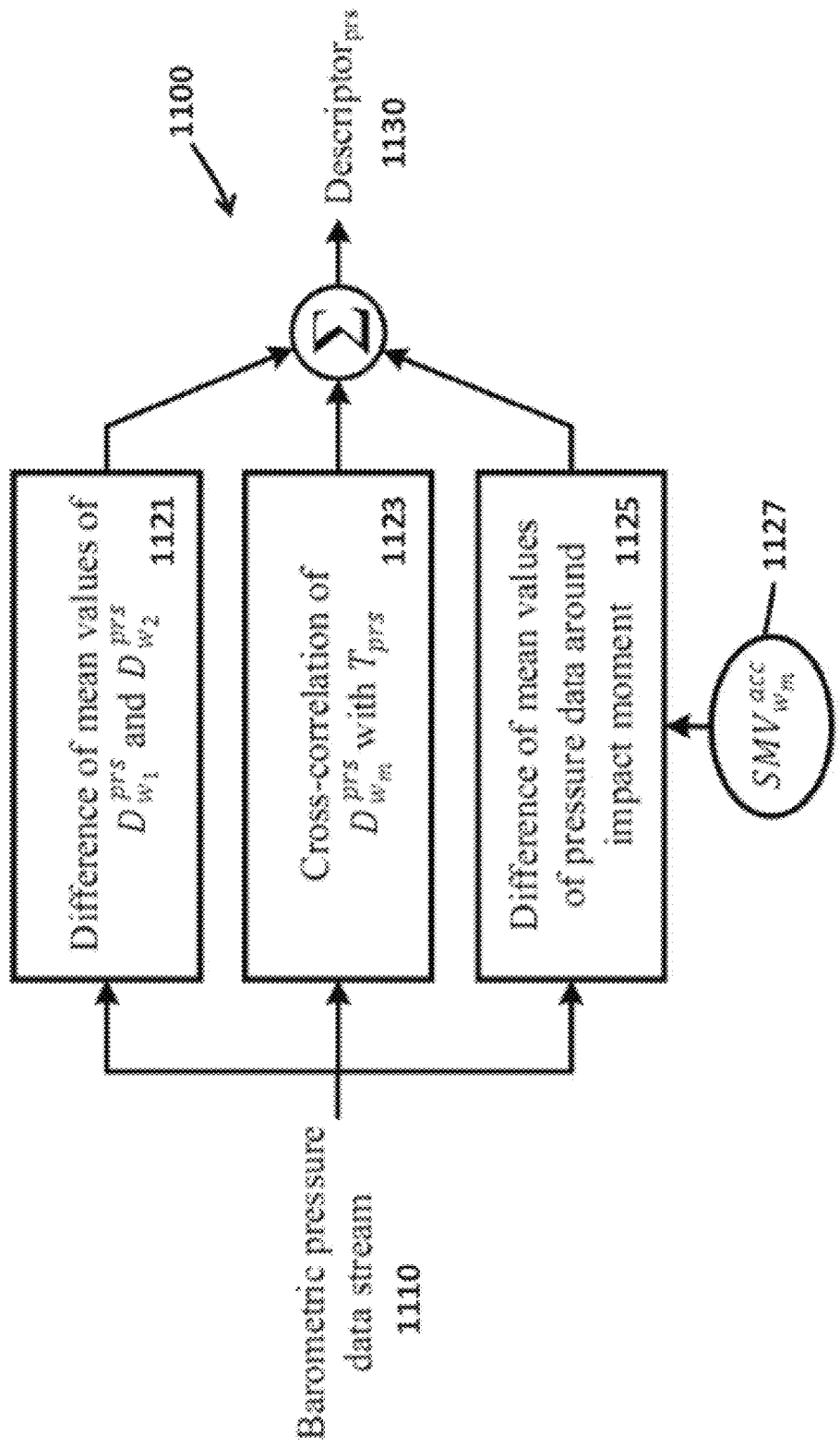
FIG. 11 illustrates, in a block diagram, an example of a process for barometric pressure-based feature extraction, in accordance with embodiments.
Figure 12A:
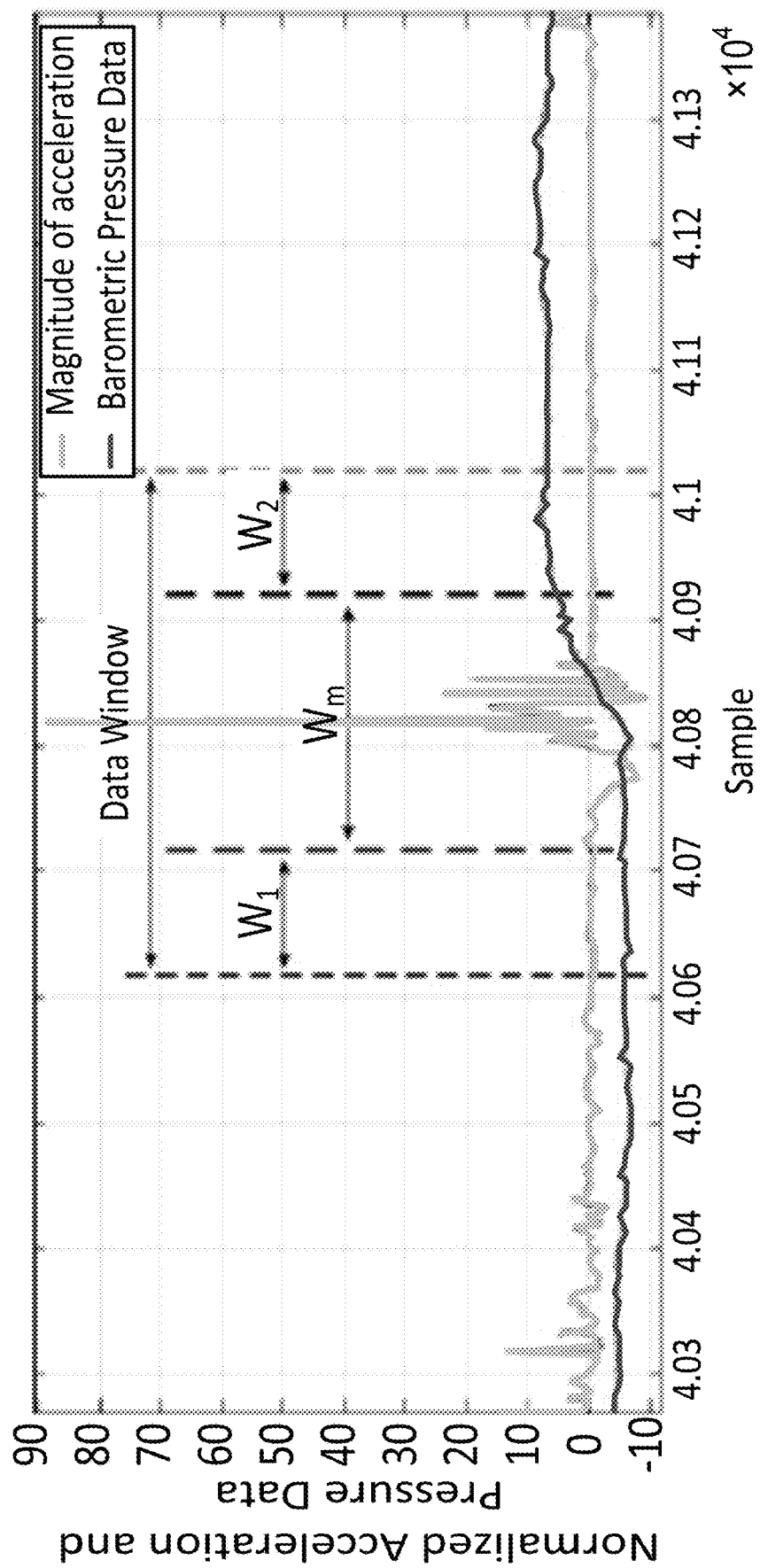
FIGS. 12A-12D (collectively, FIG. 12) illustrate four example windows representing variations in pressure and acceleration when a typical fall event occurs.
Figure 12B:
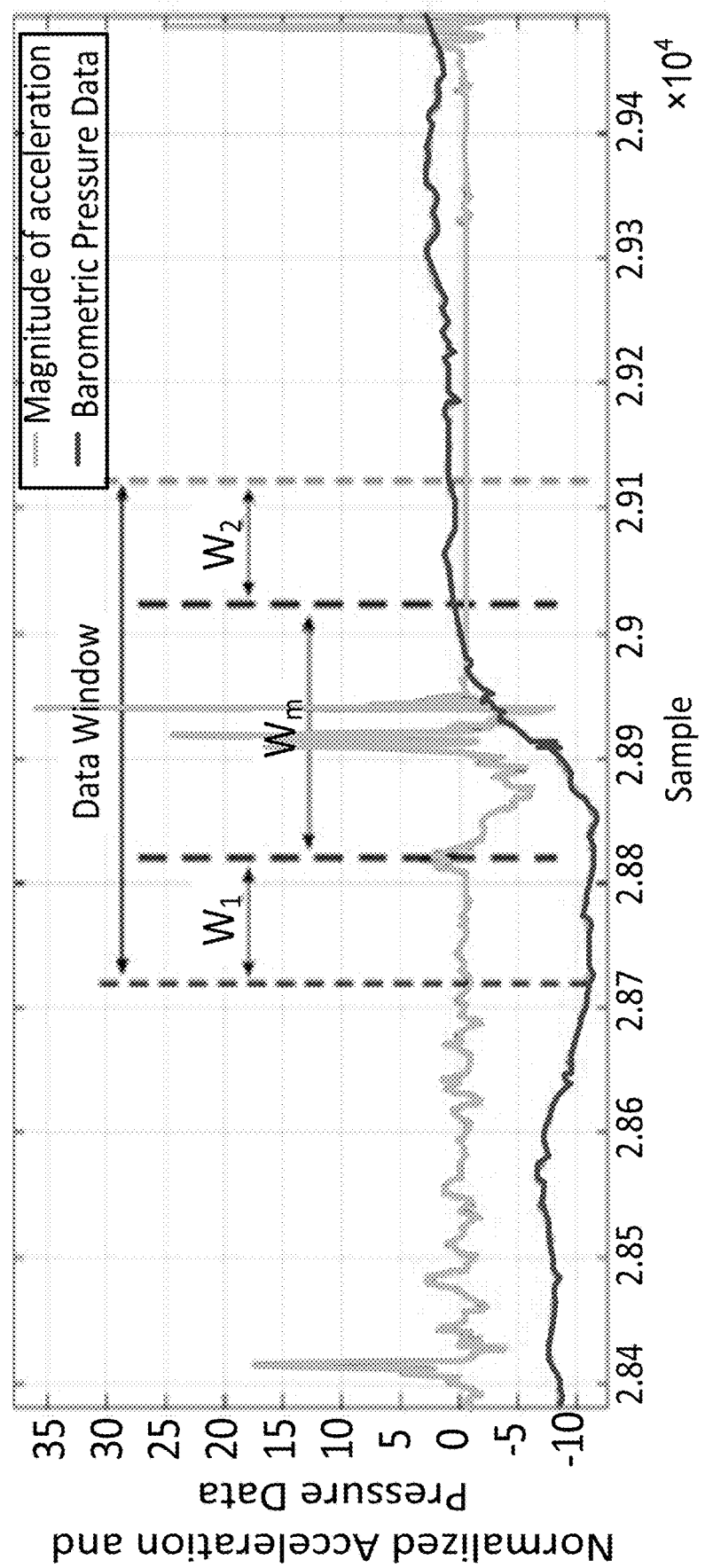
Figure 12C:
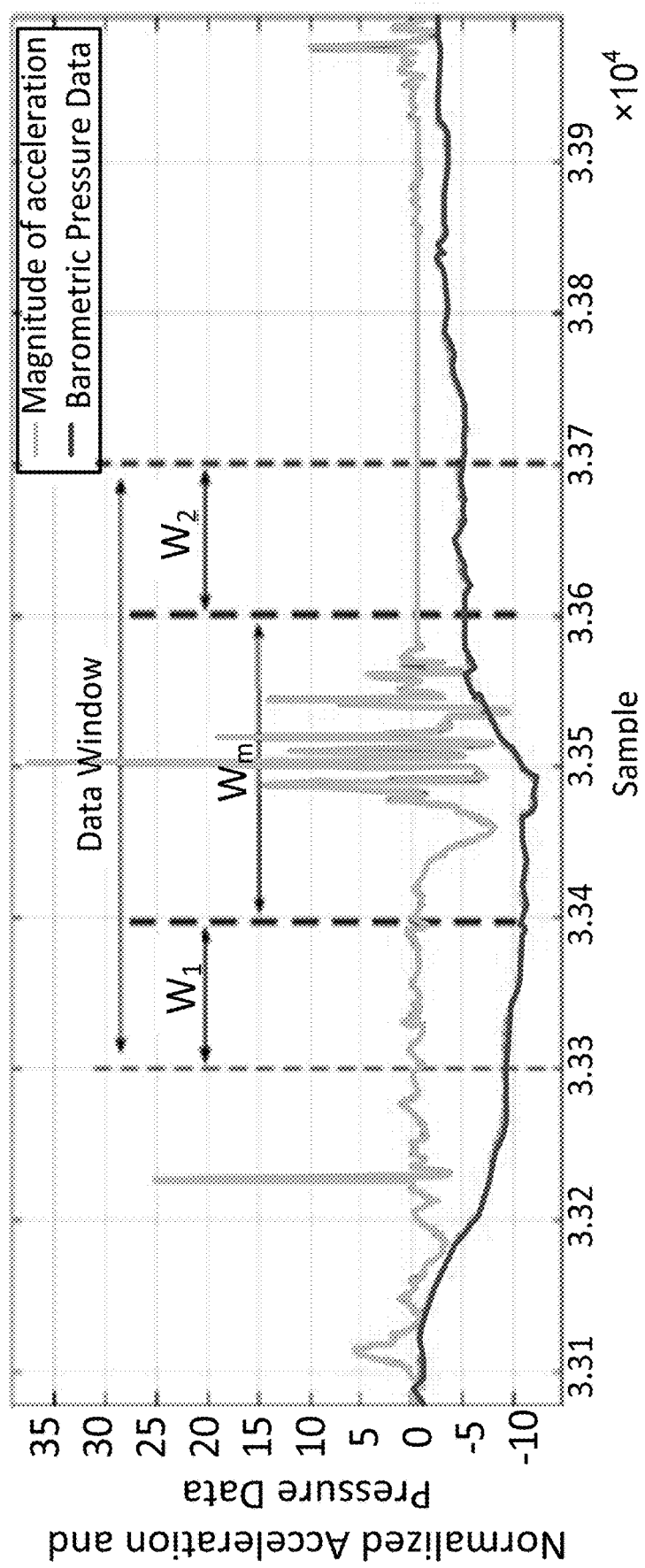
Figure 12D:
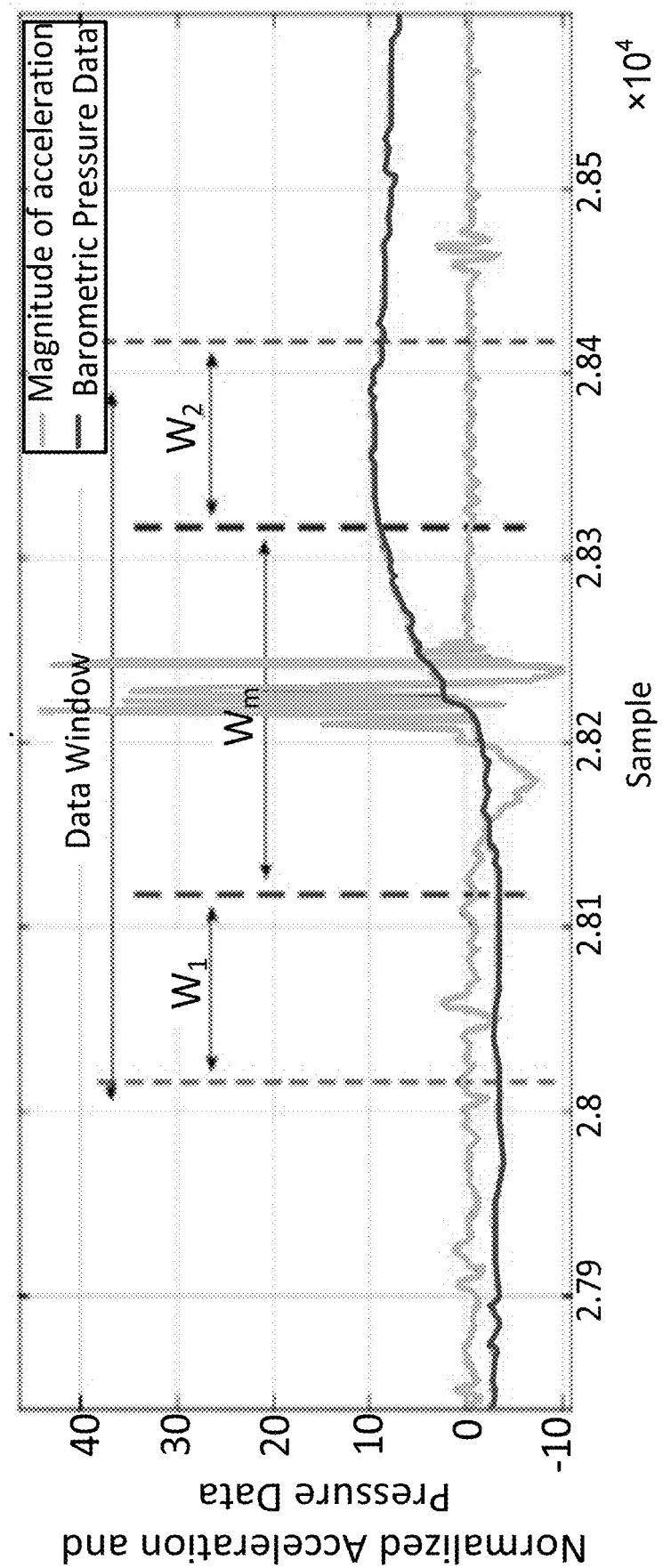

FIG. 11 illustrates an example of the process of the barometric pressure-based feature extraction 1100, in accordance with embodiments of the present disclosure. The barometric pressure-based feature extraction 1100 may comprise one or more of sub-processes extracting features based on barometric pressure data. Such feature extraction sub-processes may be associated with one or more of difference of mean values of $D_{W_1}^{prs}$ and $D_{W_2}^{prs}$ 1121, cross-correlation of $D_{W_m}^{prs}$ with $T_{prs}$ 1123, and difference of mean values of pressure data around impact moment 1125. According to embodiments, the barometric pressure data stream 1110 may be forwarded to each feature extraction sub-process of the pressure-based feature extraction 1100. Each output of the feature extraction sub-processes may be aggregated, integrated and combined together, and forwarded to the barometric pressure sensor descriptor 1130.

The feature extraction sub-process associated with difference of mean values of $D_{W_1}^{prs}$ and $D_{W_2}^{prs}$ 1121 may be related to the altitude change of the subject (e.g. fall detection device). As there is a considerable change for altitude value in occurrence of a typical fall, the altitude change of the subject may be an effective feature to be extracted for various embodiments of the present disclosure.

According to embodiments, this sub-process may calculate the difference of the average values of pressure data in sub-window $W_1$ (e.g. sub-window $W_1$ 810) and sub-window $W_2$ (e.g. sub-window $W_2$ 820) to evaluate the altitude change of the subject. The data obtained from barometric pressure sensor in sub-windows indicative of pre-fall (or pre-impact) and post-fall moments may be extracted to be employed to design a feature for detection of altitude change of the subject. FIG. 12 illustrates four example windows that represent variations in pressure and acceleration when a typical fall event occurs. The difference of mean values of pressure data in sub-window $W_1$ ($D_{W_1}^{prs}$) and pressure data in sub-window $W_2$ ($D_{W_2}^{prs}$) 1121 may be calculated as follows:

$$f_{prs} = \frac{1}{L_{w_2}}\sum_{i=1}^{L_{W_2}}D_{W_2}^{prs}(i) - \frac{1}{L_{w_1}}\sum_{i=1}^{L_{W_1}}D_{W_1}^{prs}(i)$$

The feature extraction sub-process associated with cross-correlation of $D_{W_m}^{prs}$ and $T_{prs}$ 1123 may compute the similarity between the received pressure data and a pre-defined pressure based fall template. Through this sub-process, the cross-correlation of pressure data of the window ($D_{W_m}^{prs}$) and the pressure data of a pre-defined template ($T_{prs}$) constructed from numerous real world data (e.g. data collected from previous events) may be extracted as features for detecting patterns related to changes in pressure data during fall events. The cross-correlation of $D_{W_m}^{prs}$ and $T_{prs}$ 1123 may be calculated as follows:

$$f_{corr-prs}(\tau) = \max\left(D_{W_m}^{prs}(t) \otimes T_{prs}(t)\right)$$
$$= \max\left(E\{D_{W_m}^{prs}(t) \cdot T_{prs}(t+\tau)\}\right)$$
$$= \max\left(\int_{-\infty}^{+\infty} D_{W_m}^{prs}(t) \cdot T_{prs}(t+\tau)dt\right)$$

Figure 13:
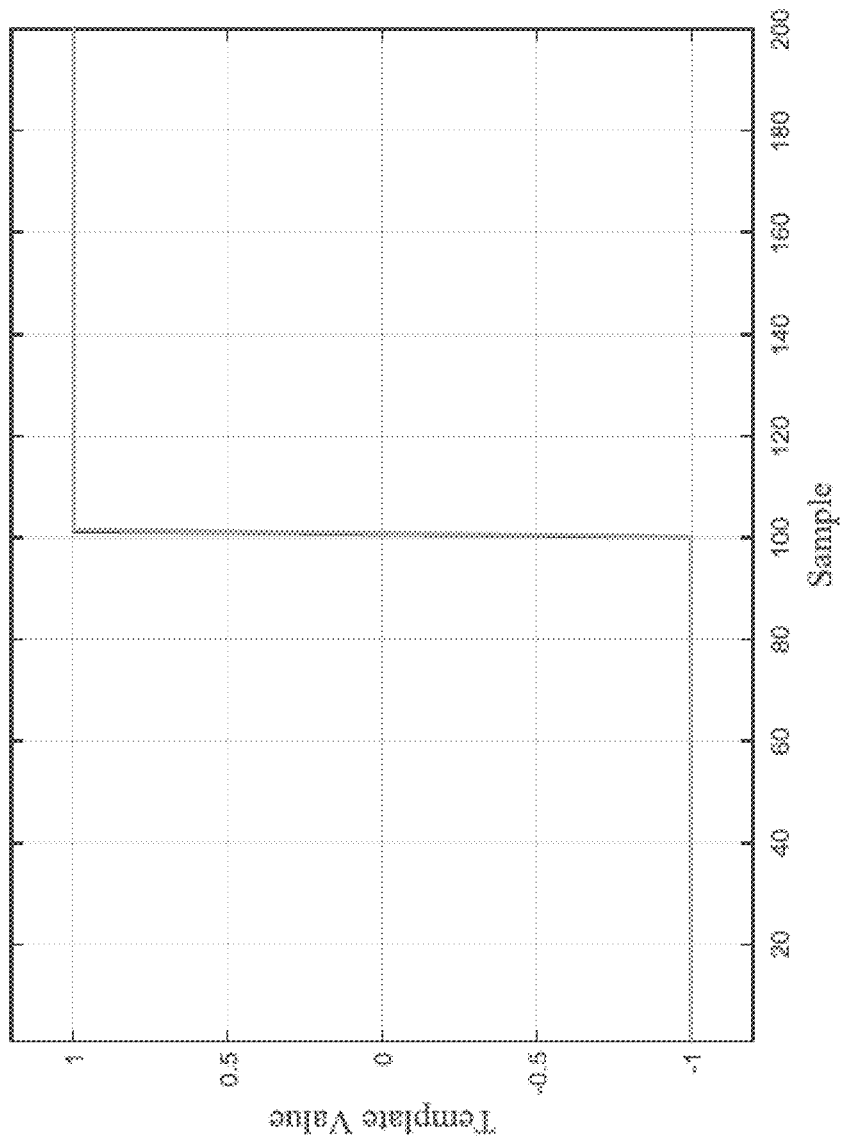
FIG. 13 illustrates an example of a pre-defined pressure-based fall template obtained based on barometric pressure data, in accordance with embodiments.

An example pre-defined pressure-based fall template obtained based on barometric pressure data is illustrated in FIG. 13. According to embodiments, the considered template, which is an inverse of Haar wavelet function, represents the transition moment in pressure data when a fall happens.

The feature extraction sub-process associated with difference of mean values of barometric pressure data around the impact moment 1125 (e.g. periods around peak value of acceleration SMV) may be related to altitude change of the fall detection device during the moments before and after (physical) impact (e.g. fall moment). The feature may be beneficial for detecting those fall-like activities such as sitting and lying down, in which the subject intentionally comes to rest on the ground, floor or other lower levels. In such activities, unlike fall events, the individual has control over his body during coming down and descending. Accordingly, the descending process will be performed more slowly compared to fall incidents. This feature can provide useful information to separate these kinds of activities from fall incidents in which usually a sudden altitude change would be happened. To calculate the value of the feature, the sample related to the peak value of acceleration SMV in the main window (e.g. $SMV_{W_m}^{acc}$ 1127) may first be extracted for detection of the impact moment. Then, difference of average value of pressure sensor data in two sample windows before and after impact moment (e.g. difference of mean values of barometric pressure data around the impact moment 1125) will be calculated as the feature value. The feature may be computed as follows:

$$f_{prs_2} = \frac{1}{L_{w\prime}} \sum_{i=i_p}^{i_p+L_{w\prime}-1} D^{prs}(i) - \frac{1}{L_{w\prime}} \sum_{i=i_p-L_{w\prime}}^{i_p-1} D^{prs}(i)$$

Where $i_p$ is the peak sample related to impacted moment in which the peak value of acceleration SMV occurs, and $L_{w\prime}$ represents the length of the pre-defined sample windows to calculate altitude change around the impact moment. In this feature, the optimum value of $L_{w\prime}$ is equal to 100.

Referring to FIG. 5, when various features are extracted from data windows at the feature extraction process 509, the data indicative of the extracted features, at step 510, may be normalized. For example, normalization process 510 may be performed through subtracting by the feature-wise minimum and dividing by the feature-wise maximum value indicative of the extracted feature from the data stream provided. To improve the normalization process 510, the average of 10 feature-wise minimum/maximum values, rather than a single minimum/maximum value, may be used.

When the feature normalization process 510 is complete, a prediction whether a fall event occurred is made, at step 511, based on the normalized features and the configured machine learning model. In various embodiments, SVM may be used as the machine learning based method, as stated elsewhere in the present disclosure. In some embodiments, the SVM may be configured to predict fall and ADLs and may be generated or enhanced upon accumulation of individual user data with respect to his or her activities including falls and ADLs.

Further referring to FIG. 5, when the prediction based on the developed machine learning based method (e.g. SVM method) is made at step 511, the further procedure of the fall detection system may depend on whether the prediction is determined, at step 512, to be indicative of fall event or non-fall event (e.g. ADLs). For instance, if the data window is detected as a non-fall activity at step 512, the next data window may be similarly processed through the steps above (e.g. steps 501 to 511 in FIG. 5). Alternately, if the data window is detected as a fall event, at step 512, by the developed machine learning based method, whether the activity is a fall or non-fall can be determined through further evaluation. In various embodiments, the further evaluation may be a fall-like rejection filter process 513. In a fall-like rejection filter process 513, the fall-like activities that are not fall events but erroneously recognized as fall events in machine learning core can be filtered and removed. Examples of such fall-like activities include but are not limited to dropping or spinning of the fall detection device, going to bed, walking down the stairs and running downhill. As these fall-like activities may provide similar features to fall events, in respect of acceleration, properties measured by gyroscopic devices, and pressure data variation waveform, at one or more data windows (e.g. data windows representing the fall-like activities), the fall-like activities that are erroneously recognized as fall event, for example at steps 511 or 512, may be identified.

Figure 14:
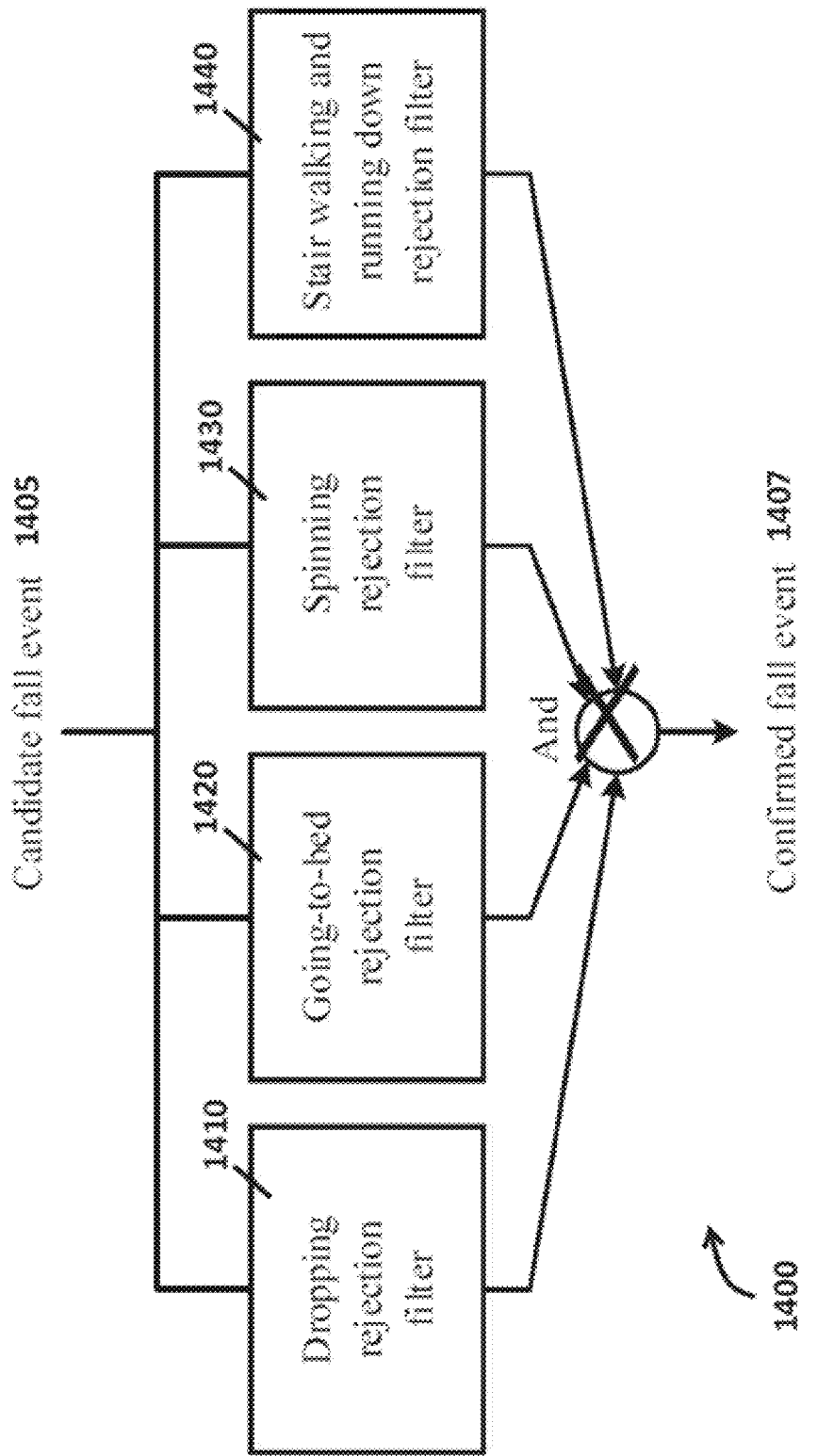
FIG. 14 illustrates, in a block diagram, an example of a process for fall-like rejection filtering, in accordance with embodiments.

FIG. 14 illustrates, in a block diagram, an example of the process of fall-like rejection filtering 513 considered as the last block of the fall detection method in FIG. 5, in accordance with embodiment. Referring to FIG. 14, candidate fall event 1405 may be forwarded to the fall-like rejection filtering process 1400. The candidate fall event 1405 is an activity or event predicted to be fall event based on machine learning based method at steps 511 and 512 of FIG. 5. Through the filtering process 1400, this event can be scrutinized whether the candidate fall event 1405 is a fall event or non-fall event such as one of the fall-like activities. According to embodiments, the filtering process 1400 may include one or more filters such as dropping rejection filter 1410, going-to-bed rejection filter 1420, spinning rejection filter 1430 and stair walking and running down rejection filter 1440.

The dropping rejection filter 1410 may filter activities related to device dropping events, which are mistakenly identified as fall events. The dropping rejection filter 1410 is configured and implemented based on the real-world free-fall acceleration data in order to eliminate drop data that is erroneously detected as a fall. In the dropping rejection filter 1410, SMV of data in sub-window $W_1$ from accelerometer sensor ($D_{W_1}^{acc}$) and data in main window from accelerometer sensor ($D_{W_m}^{acc}$) may be processed for detecting device dropping events. According to embodiments, the samples in which the SMV of both $D_{W_1}^{acc}$ and $D_{W_m}^{acc}$ are less than the threshold value defined as the rejection filtering parameter (RFP) (e.g. $RFP_{drop1}$) may be detected. It will be understood that the threshold value for rejection filtering can be determined such that at least most false positives (non-fall events originally identified as a fall-event) are removed. If the number of the consecutive data samples satisfying this condition is greater than $RFP_{drop2}$, the data window that is currently being filtered would be recognized as a non-fall event where the fall detection device is dropped.

Figure 15:
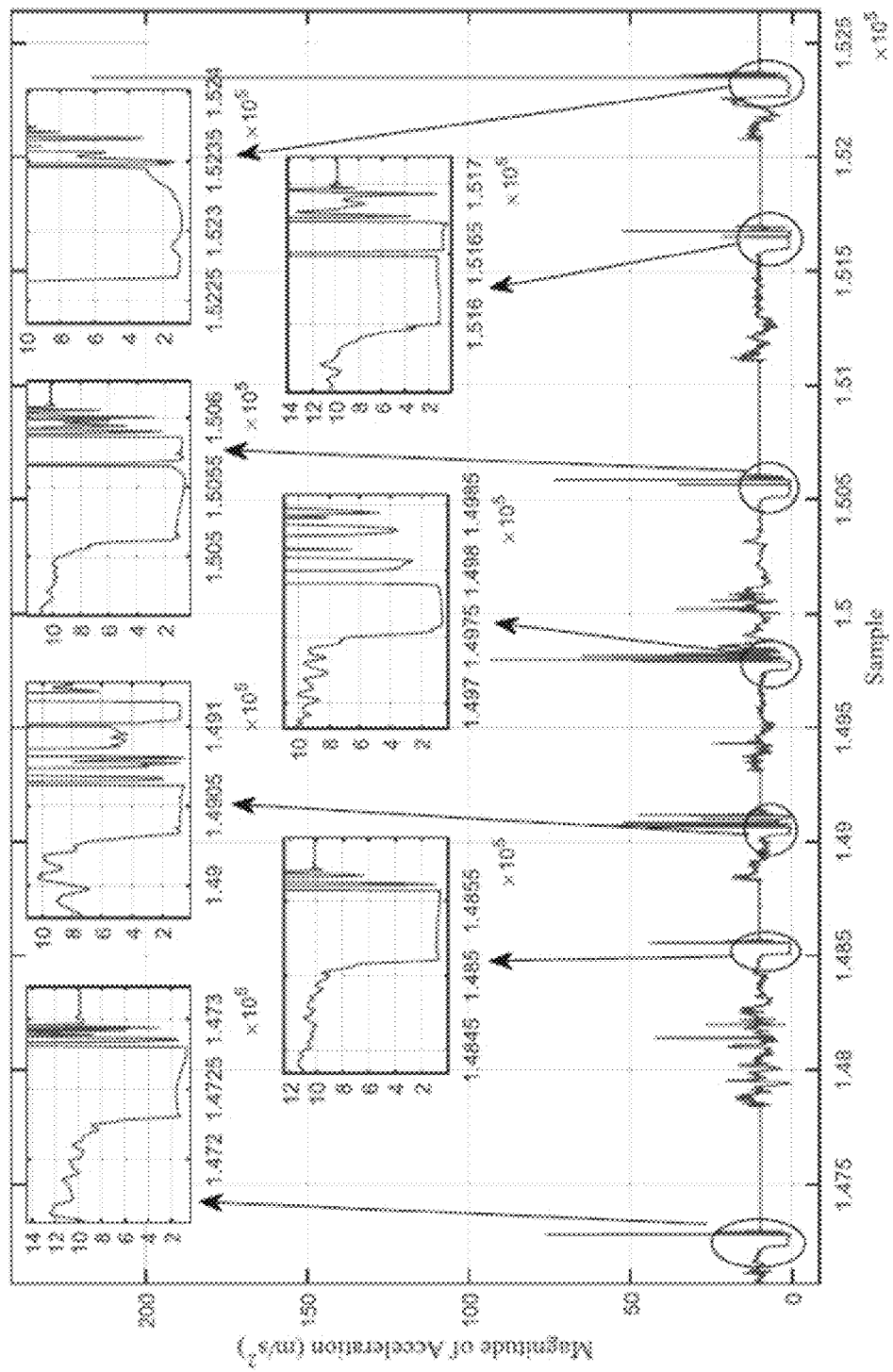
FIG. 15 illustrates plural sample data windows describing variations in SMV of acceleration during events of device dropping, in accordance with embodiments.
Figure 16A:
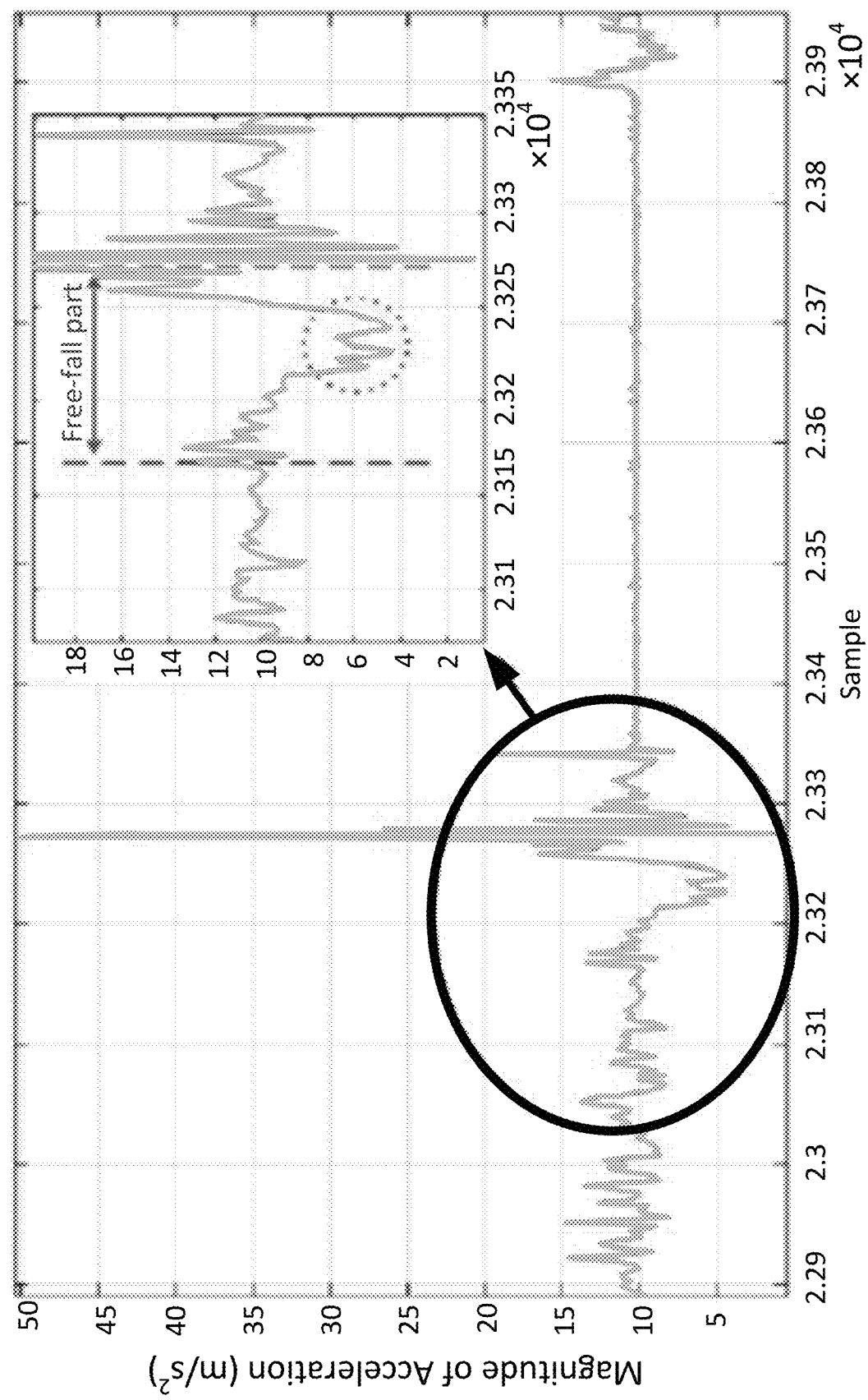
FIGS. 16A-16D (collectively, FIG. 16) illustrate example data sample windows representing magnitude of acceleration, during free-fall, for typical fall events and 'going-to-bed' events, respectively, according to embodiments.
Figure 16B:
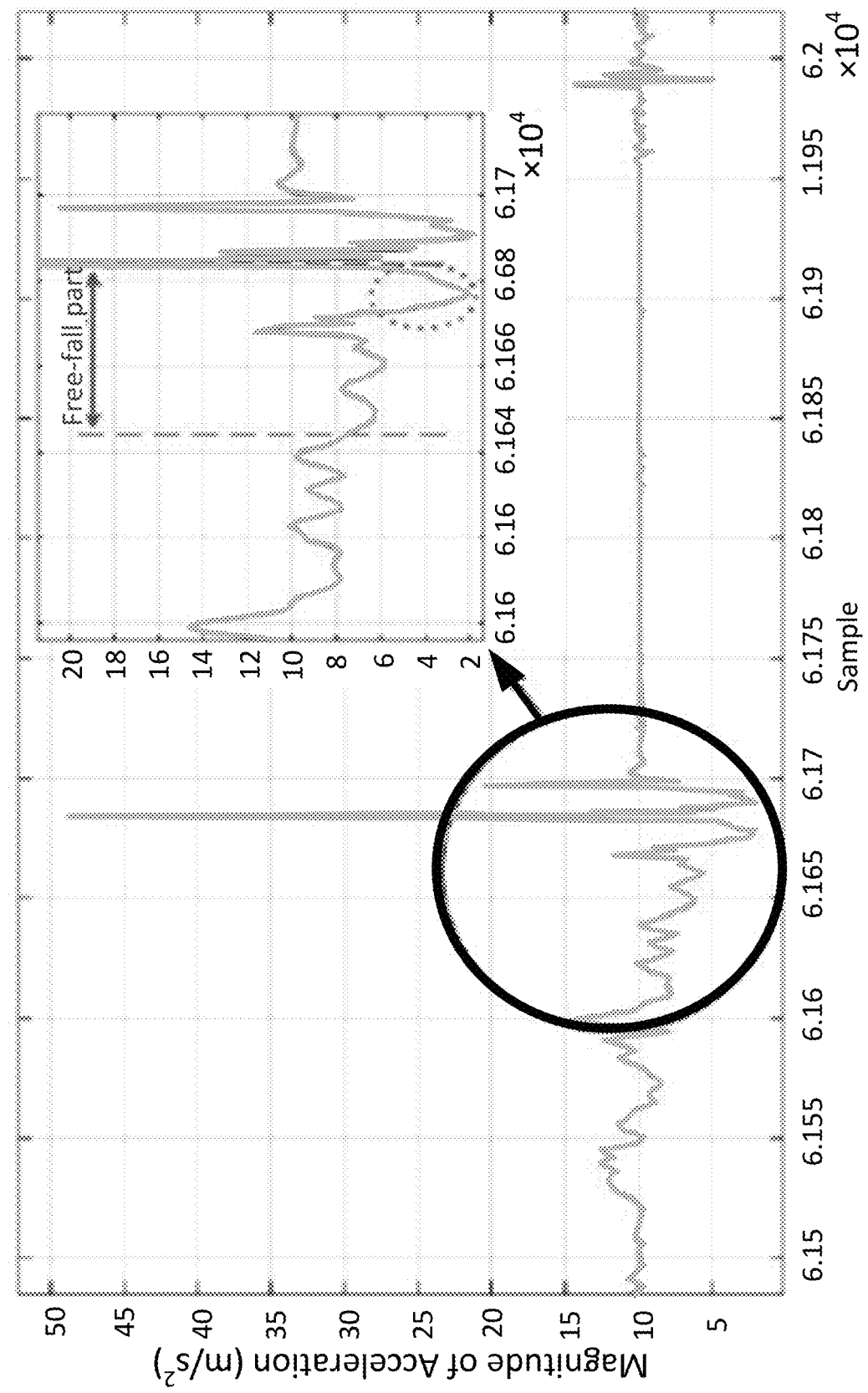
Figure 16C:
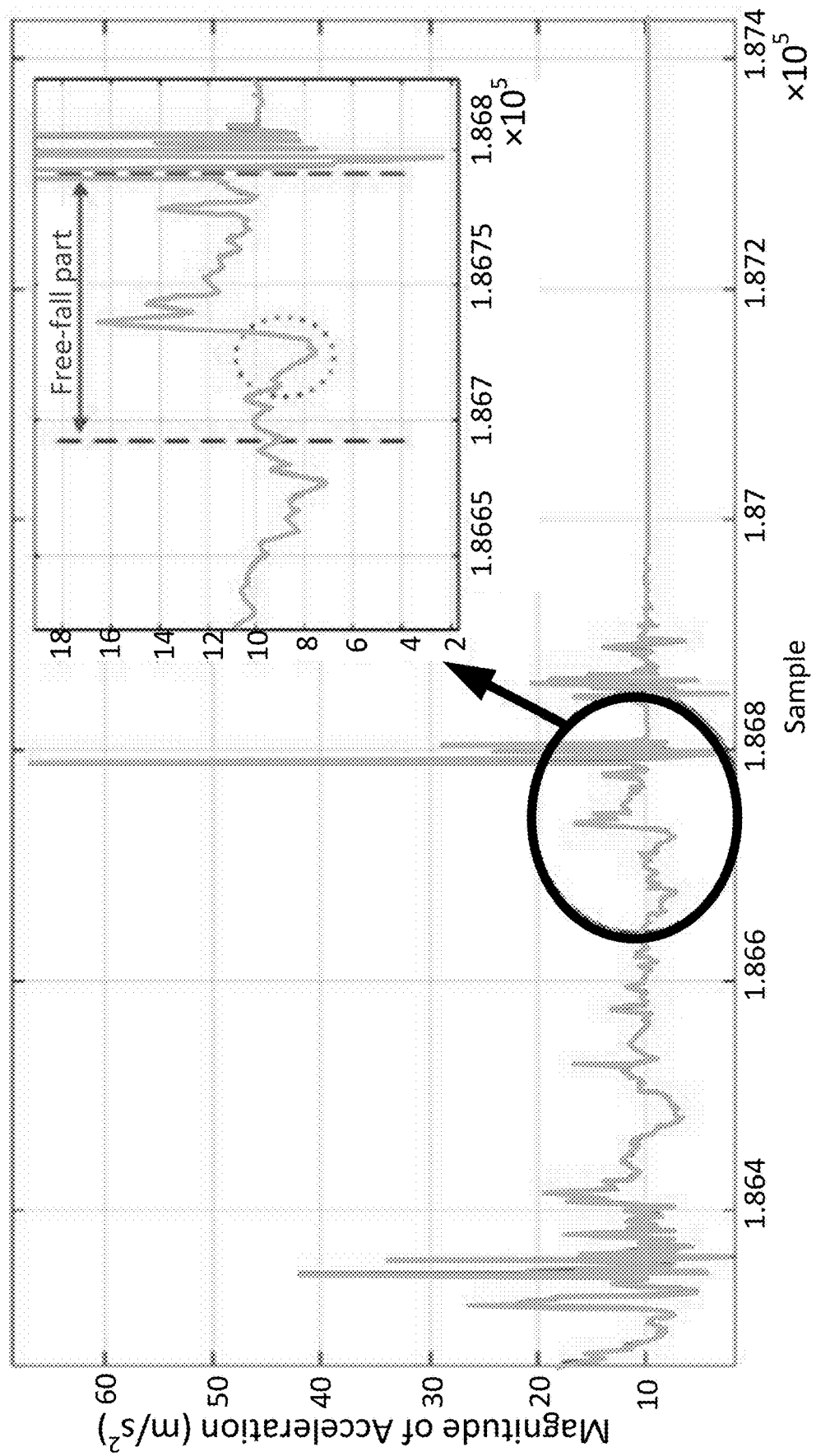
Figure 16D:
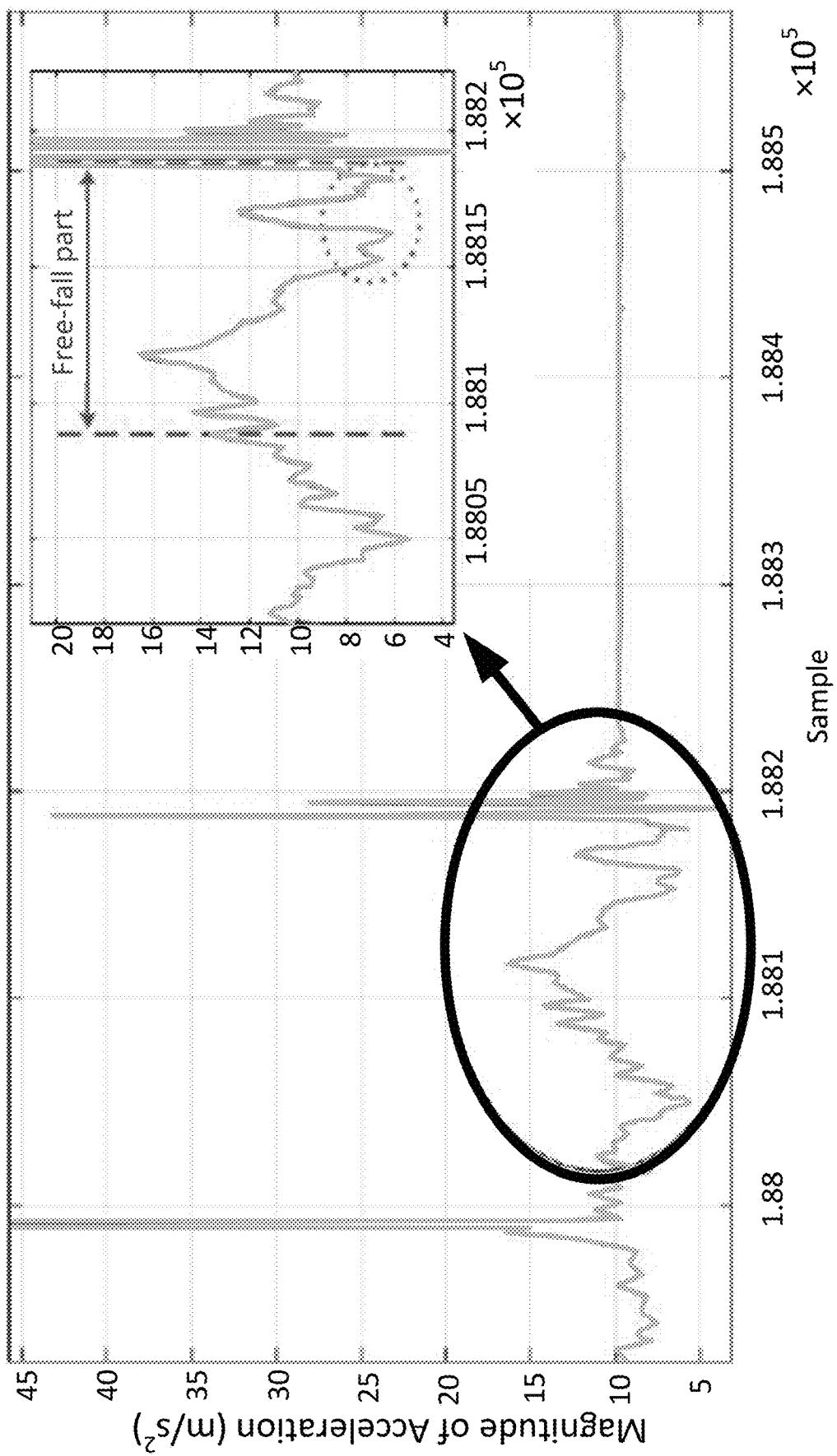

FIG. 15 illustrates seven sample data windows describing variations in SMV of acceleration during the events of device dropping. In particular, FIG. 15 illustrates the magnitude of acceleration in several data samples representing device dropping events. In some embodiments, the optimum values, $RFP_{drop1}$ and $RFP_{drop2}$, may be considered to be 2 m/s² and 36 m/s², respectively. The optimum values, $RFP_{drop1}$ and $RFP_{drop2}$, may be obtained in accordance with cross-validation.

The going-to-bed rejection filter 1420 may filter activities related to 'going to bed', which are mistakenly identified as a fall event, by analyzing the magnitude of acceleration of the activities. The going-to-bed rejection filter 1420 can be configured and implemented based on the real-world acceleration data associated with the going-to-bed activity in order to eliminate data related to the going-to-bed activity being erroneously identified as a fall event. FIG. 16 illustrates example data sample windows representing the magnitude of acceleration, during free-fall, for typical fall events and 'going-to-bed' events, respectively. In order to distinguish the fall events from the 'going-to-bed' events, the going-to-bed rejection filter 1420 may detect the data sample associated with the peak of both $D_{W_1}^{acc}$ and $D_{W_m}^{acc}$. Then, the data window including data samples associated with $RFP_{go2bed1}$ before the data samples associated with the peak of both $D_{W_1}^{acc}$ and $D_{W_m}^{acc}$ may be recognized as free-fall part. Subsequently, the data samples associated with $RFP_{go2bed2}$ having the lowest acceleration values may be detected in the free-fall part recognized above. If the average of these minimum values, namely the lowest acceleration values, exceeds $RFP_{go2bed3}$, the data window currently under processing may be recognized as a 'going-to-bed' activity. In other words, the data samples may be indicative of cases where the person has controlled his body when sitting down in a chair or lying down in a bed. In such a case, the magnitude of the acceleration in the free-fall part of the detected activity would not meet the required condition to be classified into a fall event. In some embodiments, the threshold values, $RFP_{go2bed1}$, $RFP_{go2bed2}$ and $RFP_{go2bed3}$, may be considered to be 100 m/s², 3 m/s² and 6.2 m/s², respectively. The threshold values, $RFP_{go2bed1}$, $RFP_{go2bed2}$ and $RFP_{go2bed3}$, may be obtained in accordance with cross-validation.

According to embodiments, the spinning rejection filter 1430 may calculate the average of SMV of $D_{W_m}^{acc}$ in order to distinguish the data windows related to events of device spinning from fall events. The spinning rejection filter 1430 is configured and implemented based on the real-world acceleration data associated with events of the device spinning in order to eliminate data related to the device spinning event (e.g. activities involving rotating of the device) that is erroneously detected as a fall. If the average of SMV of $D_{W_m}^{acc}$ calculated exceeds $RFP_{spin}$, the data windows currently being processed may be detected as an event of device spinning.

In some embodiments, the spinning rejection filter 1430 may perform the filtering process based on the history of previous fall decisions (e.g. decisions made with respect to whether the event is a fall).

Figure 17A:
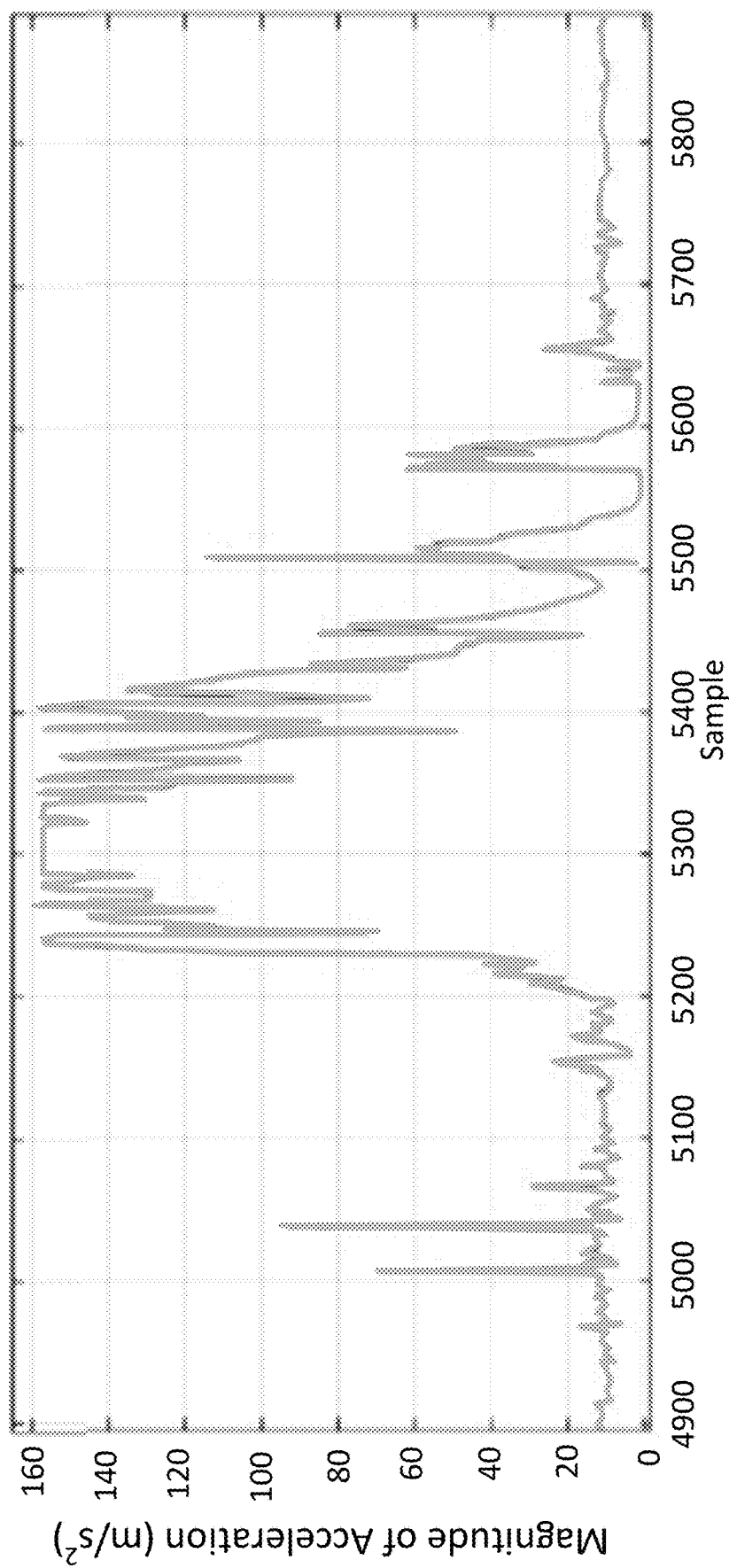
FIGS. 17A-17C (collectively, FIG. 17) illustrate magnitude of acceleration for three data samples of device spinning events according to embodiments.
Figure 17B:
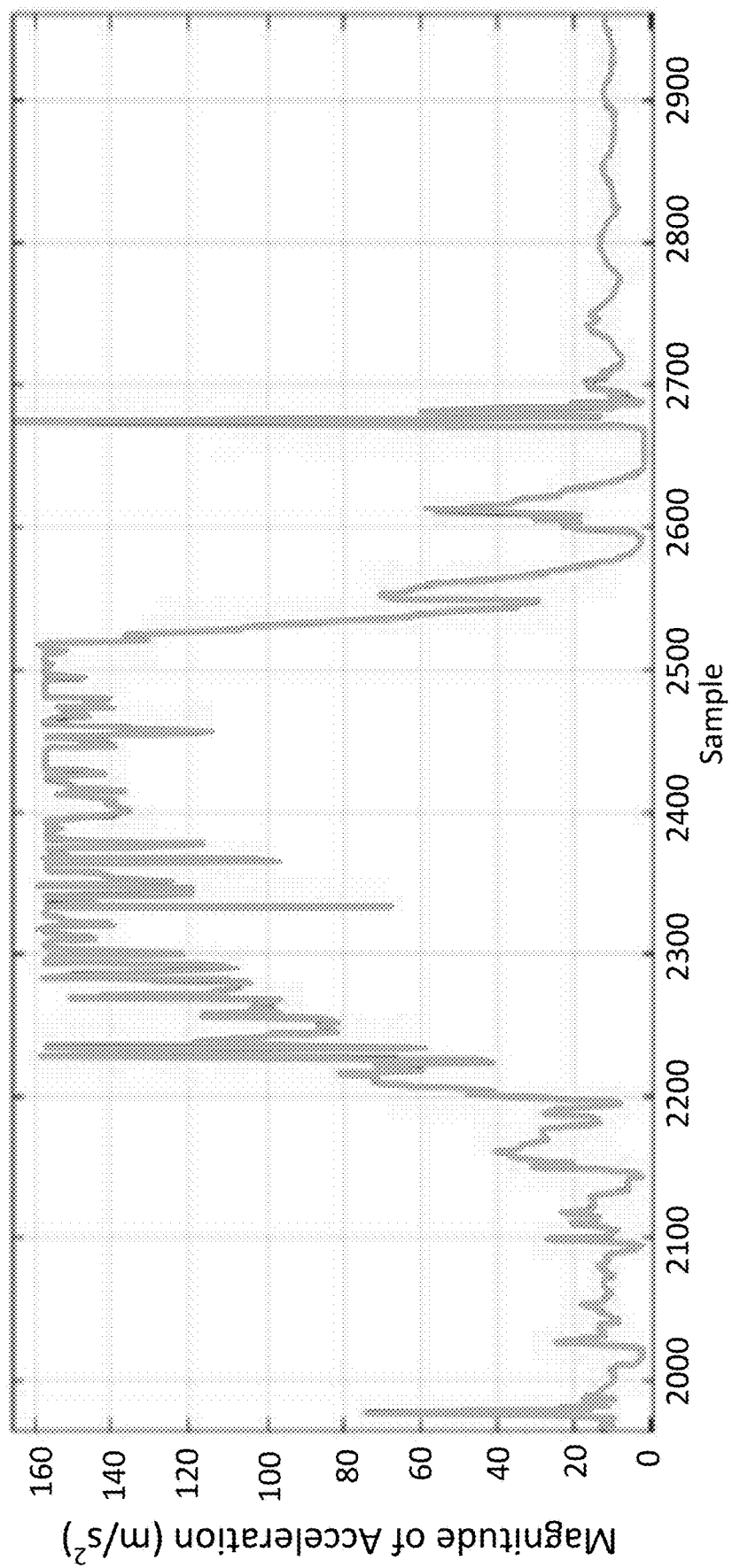
Figure 17C:
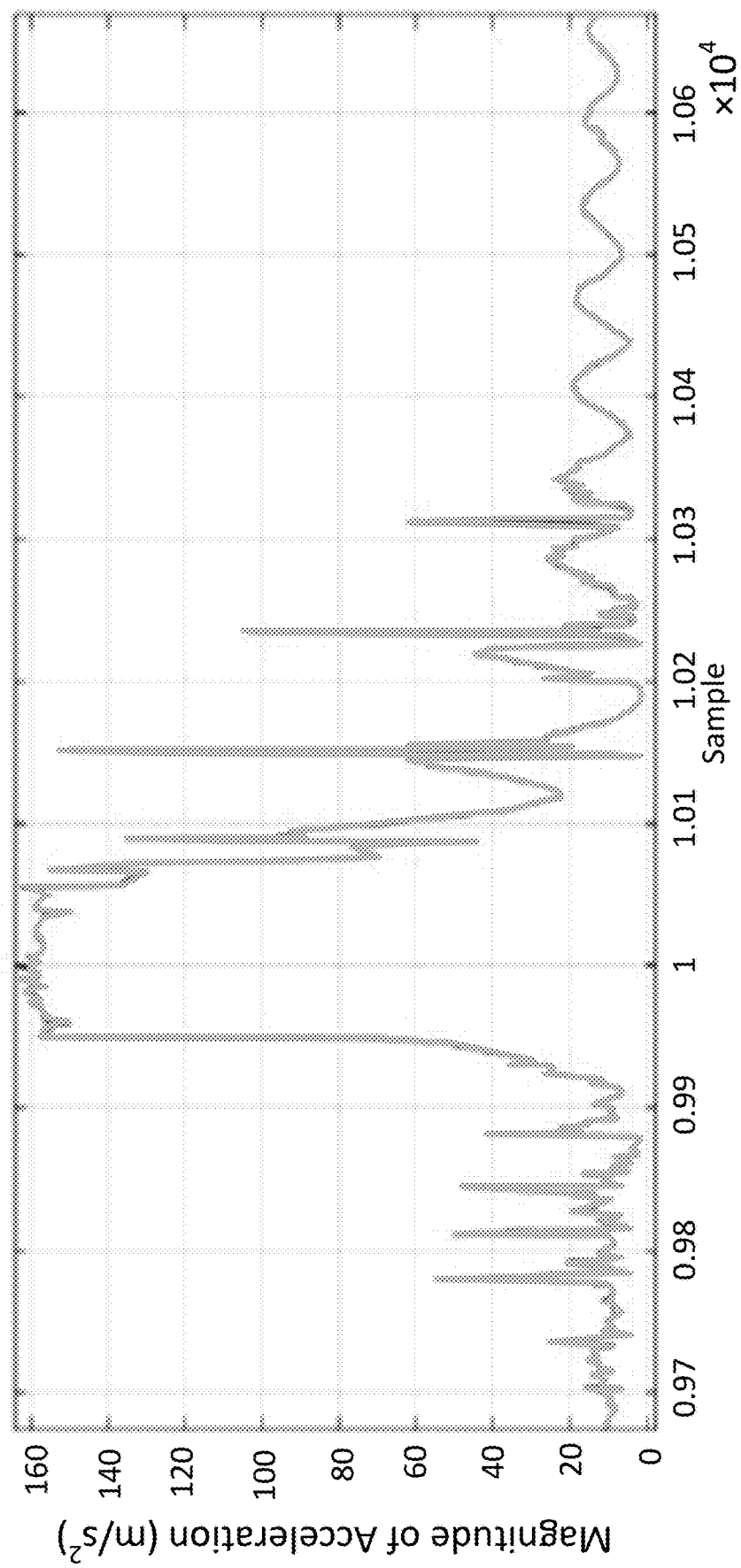
Figure 18A:
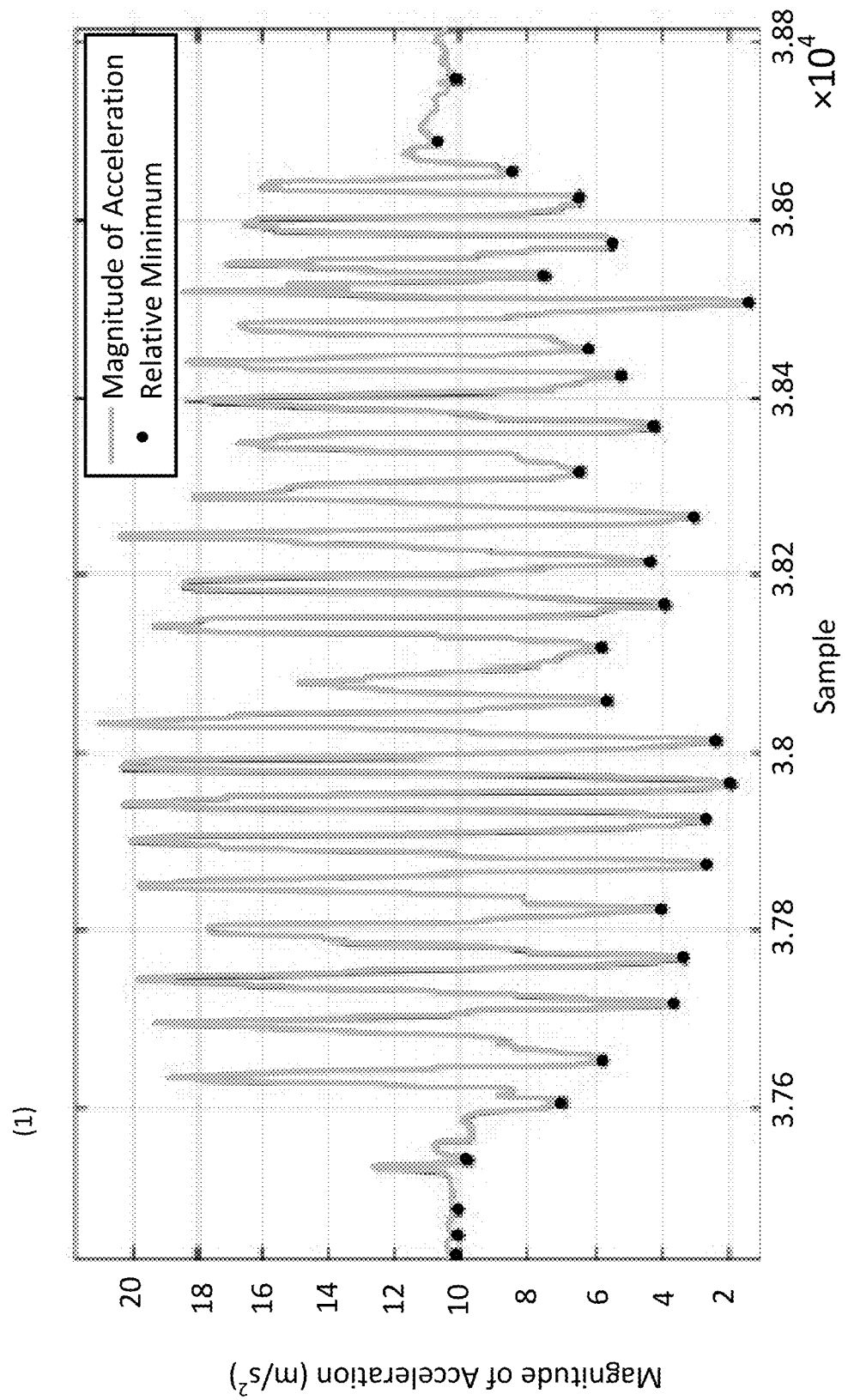
FIGS. 18A-18D (collectively, FIG. 18) illustrate the filtered acceleration variations representing various activities including walking up and down staircases, running up and down staircases and two fall incidents, respectively, according to embodiments.
Figure 18B:
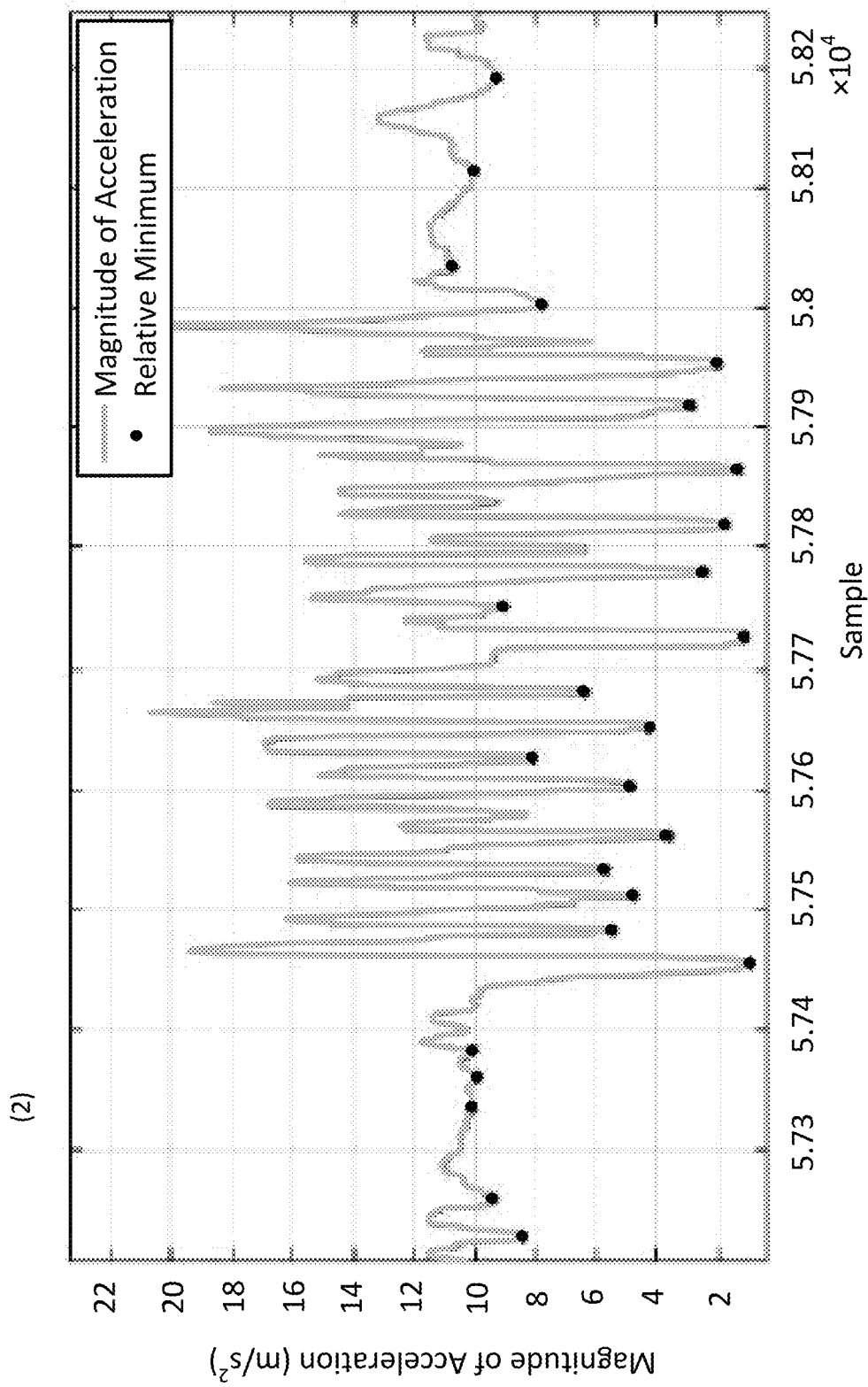
Figure 18C:
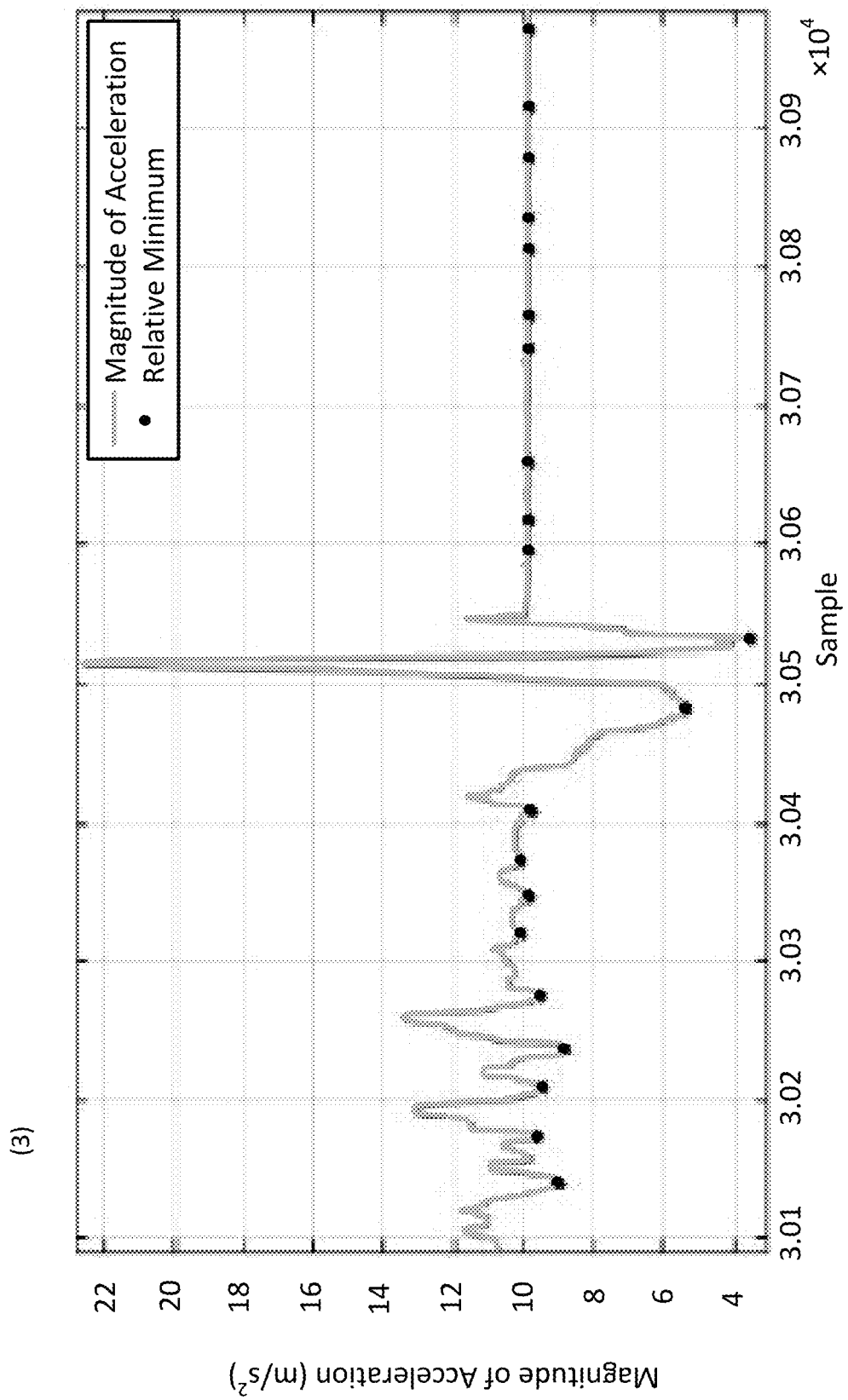
Figure 18D:
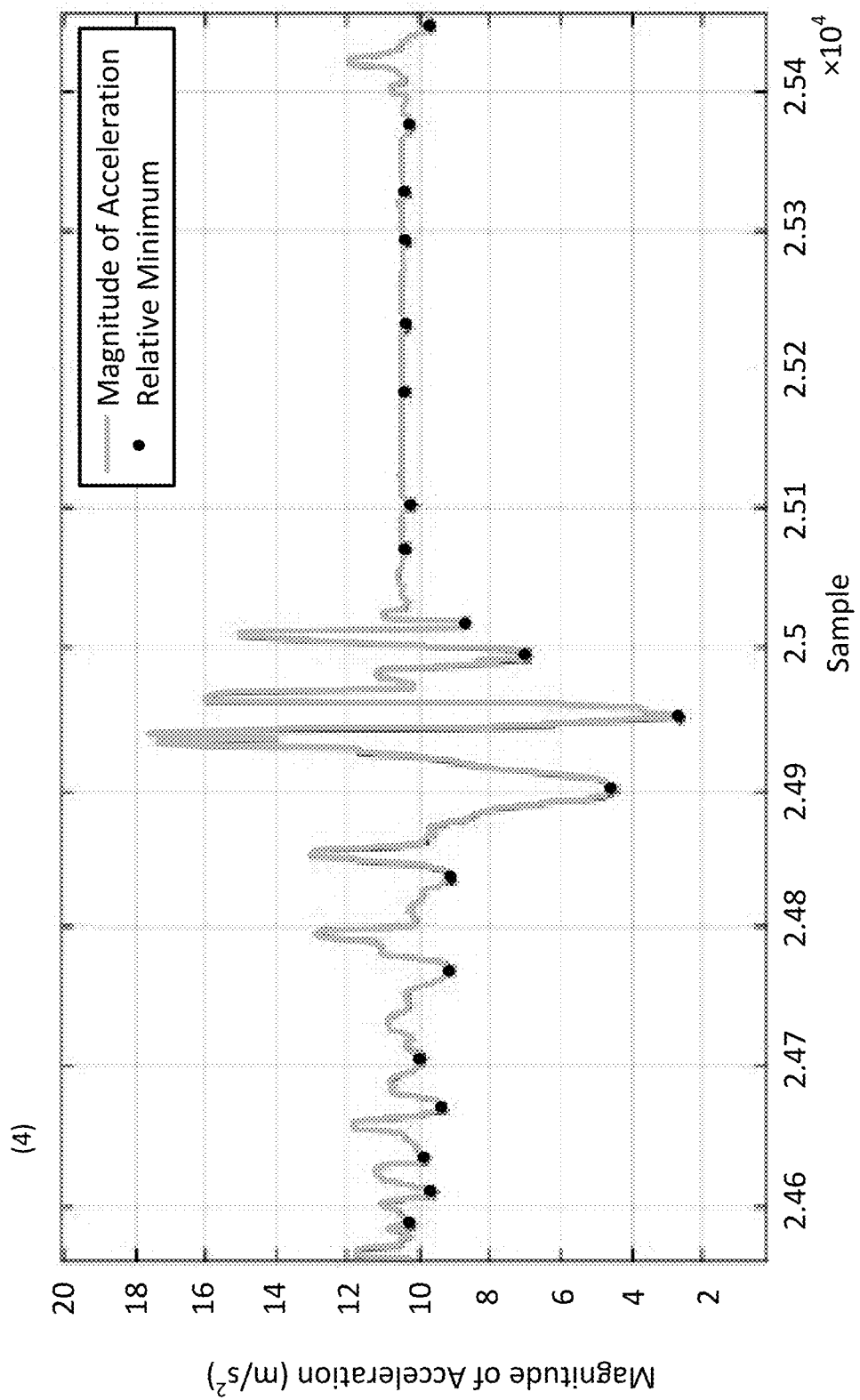

FIG. 17 illustrates magnitude of acceleration for three data samples of device spinning events. In some embodiments, the optimum value, $RFP_{spin}$, may be considered to be 25 m/s². The threshold value, $RFP_{spin}$, may be obtained in accordance with cross-validation.

According to embodiments, the stair walking and running down rejection filter 1440 may distinguish fall events from activities like walking down on stairs, running on a staircase or downhill road. Activities like walking down on stairs or running on a staircase or downhill road may comprise the moment of free-fall and the moment of physical impact. When activities like walking down on stairs or running on downhill road are conducted, the properties (e.g. pressure values) measured by sensors may be similar to those of a fall event. The stair walking and running downhill rejection filter 1440 can be configured and implemented based on the real-world acceleration data waveform related to activities like walking down stairs or running down a staircase or downhill down a road, in order to eliminate data related to the mentioned activities that is erroneously detected as a fall. The acceleration data waveform may change regularly while the user performs one of those activities.

In order to distinguish and filter activities like walking down on stairs or running downhill on a road from a (detected) fall event, SMV of acceleration of whole data window, including $D_{W_1}^{acc}$, $D_{W_2}^{acc}$ and $D_{W_m}^{acc}$, may be passed through a moving average filter with a data window of length 10. The moving average filtering may be used to omit the spike noise of acceleration data. Then, the values of relative minima of the filtered acceleration may be detected. After sorting the values of the identified minima in an ascending order, the average of third, fourth and fifth minimum values may be calculated and compared to $RFP_{stair}$. If the average value is less than $RFP_{stair}$, the data windows currently being processed may be detected as a non-fall event, for example activities like walking down on stairs or running on downhill road. In some embodiments, the threshold value, $RFP_{stair}$, may be considered to be 5.7 m/s². The threshold value, $RFP_{stair}$, may be obtained in accordance with cross-validation.

In some embodiments, the stair walking and running down rejection filter 1440 may perform the filtering process based on the history of previous fall decisions (e.g. decisions made with respect to whether the event is fall).

FIG. 18 illustrates the filtered acceleration variations representing various activities including walking up and down on staircases, running up and down on staircases and two fall incidents, respectively. FIG. 18 also identifies relative minimum values (e.g. local minima) of the magnitude of acceleration for each activity. Referring to FIG. 18, the identified relative minimum values are represented by black dots. Specifically, the black dots represent the identified relative minimum values for the user (1) walking up and down on staircases, (2) running up and down on staircases, (3) falling down forwards (e.g. on the user's face), (4) falling down backwards (e.g. on the user's back). As illustrated in FIG. 18, after filtering the magnitude of acceleration, fall events usually have only two minimum values (e.g. local minima) occurring before and after impact moment (e.g. acceleration peak value). However, when walking or running down on staircases, relative minimum values (e.g. local minima) may appear periodically, and this feature (e.g. periodic occurrence of relative minimum values) can distinguish the fall-like activities from a fall event.

According to embodiments, referring to FIG. 5 and FIG. 14, once the fall-like rejection filtering process 513, for example using one or more of the filtering method defined above and in FIG. 14, is completed and does not regard the candidate fall event 1405 as a non-fall event, the data window currently being processed may be considered as then confirmed to be a fall event 1407. Upon the confirmation of detection of a fall event, the fall detection system may request for help to caregivers or medical professionals or may conduct other further procedures (e.g. generate fall alarms) as configured in the system.

Despite initial training of the machine learning based models on a wide data set, there remains potential that the machine learning based model will register false positives (i.e. will confirm detection of a fall event 1407 when no fall event has taken place) when the machine learning based model is applied to the varying characteristics and ADLs of each individual user. The efficacy of the fall detection system for an individual user will thus benefit from a personalization process specific to that individual user.

Figure 19:
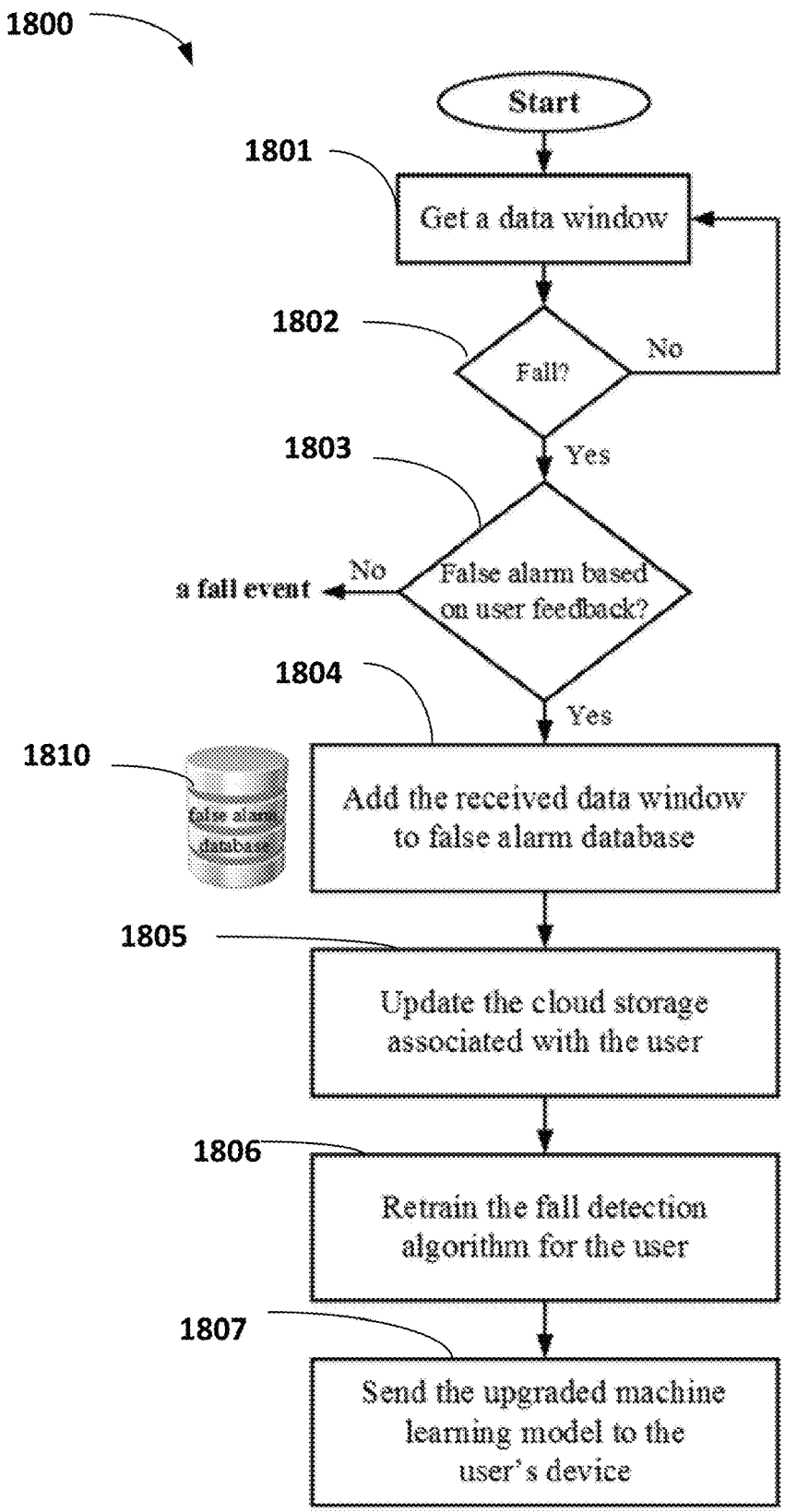
FIG. 19 illustrates, in a flow diagram, a method for a personalization process, in accordance with embodiments.

FIG. 19 is a flowchart of a personalization process 1800 according to some embodiments. At step 1801, the fall detection system collects data samples from the sensors comprising a data window of interest. At step 1802, the fall detection system performs all the steps necessary to determining that an event is a true fall event, including, but not limited to data windowing and segmentation 508, extracting features 509, normalization 510, fall event prediction 511, fall event determination 512 and filtration using fall-like rejection filters 513. If the data window is confirmed to be a fall event 1407 following the fall-like rejection filters, the user may be given a time period in which to provide user feedback as to whether the fall event is a false alarm to the fall detection system before the fall detection system conducts further procedures such as generating fall alarms or requesting help. The user may deliver the user feedback through any convenient method known in the art, including but limited to, a button on a pendant or wrist device comprising part of the fall detection system or voice commands to a microphone associated with the fall detection system.

At step 1803, if the user does not indicate that the confirmed fall event 1407 was a false alarm, the fall detection system will proceed to treat the fall event as a true confirmed fall event 1407 as described above and conduct further procedures as configured.

At step 1804, If the user indicates that the fall event was a false alarm, then the fall detection system will add the data window associated with the false alarm event to a local false alarm database 1810. At step 1805, the accumulated false alarm events stored in the local false alarm database 1810 are periodically uploaded to a cloud storage database associated with the individual user. The cloud storage database may comprise a subset of the full data set that is used for training the machine learning based model.

At step 1806, the machine learning based model for the individual user is re-trained on a data set comprising, in part or all, the false alarm event data windows that are uploaded to the cloud storage database for the individual user. In this way the machine learning based model is personalized to the individual user. At step 1807, the updated machine learning based model is downloaded into the individual's fall detection system and is used in the step of determining if an event is a fall event from then on. As this process of storing and uploading false alarm data windows, retraining the machine learning based model, and downloading the updated machine learning based model is repeated over time, the fall detection system is increasingly personalized to the individual user. As a result, the accuracy of the fall detection system in detecting true fall events 1407 for the individual user improves through use.

According to some embodiments, data windows associated with both confirmed fall events and false alarm fall events may be stored locally and periodically uploaded to the individual's cloud storage database. These data windows may then be uploaded to the data set used for initially training the machine learning based model. In this way, the initial training data set, which may have originally comprised fall event data from healthy individuals, is augmented by data from under care and elderly users and the augmented data set is then used to re-train the machine learning based model. This updated machine learning based model may be downloaded to each of the fall detection systems associated with new individual users that have not yet populated their respective false alarm database 1810. The updated machine learning based model may also be downloaded to the fall detection systems of existing users, or the updated machine learning based model may be further trained on the individual user's false alarm data set and then downloaded to that individual user's fall detection system. In this way, the accuracy of the machine learning based model may be globally improved as well as personalized for each individual user.

Figure 20:
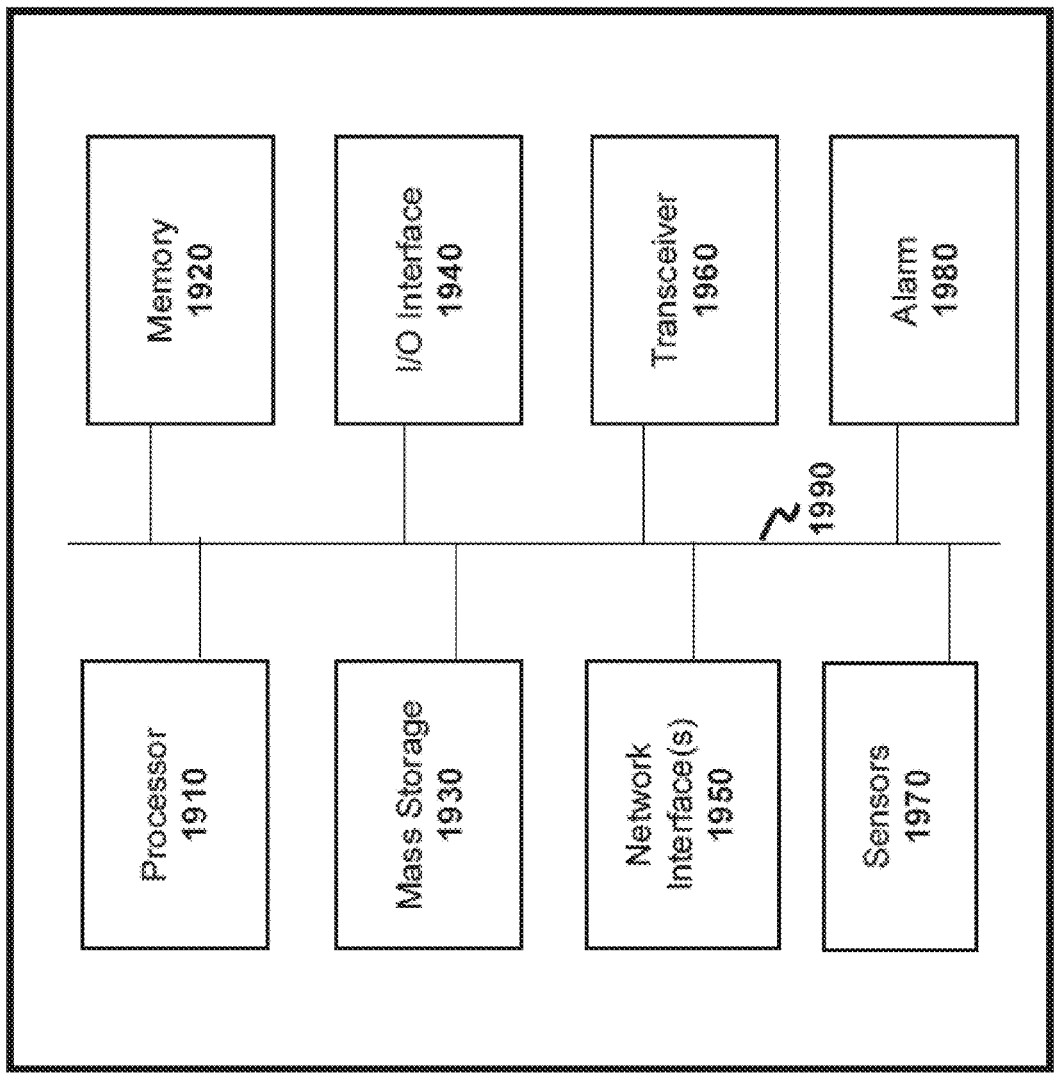
FIG. 20 illustrates, in a schematic diagram, a device detecting a fall event, in accordance with embodiments.

FIG. 20 is a schematic diagram of a device 1900 for detecting a fall event of a user that may perform any or all of operations of the above methods and features explicitly or implicitly described herein, according to different embodiments. For example, any mobile device or wearable apparatus (e.g. pendant, wristband, wearable fitness gear, etc.) may be configured the device 1900.

As shown, the device 1900 includes a processor 1910, memory 1920, non-transitory mass storage 1930, I/O interface 1940, network interface 1950, a transceiver 1960, sensors 1970, and an alarm 1980, all of which are communicatively coupled via bi-directional bus 1990. According to certain embodiments, any or all of the depicted elements may be utilized, or only a subset of the elements. Further, the device 1900 may contain multiple instances of certain elements, such as multiple processors (e.g. general-purpose microprocessors such as CPU and/or specialized microprocessors such as digital signal processor or other processing units or devices as would be readily understood), memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 1920 may include any type of non-transitory memory such as static random access memory (SRAM), dynamic random access memory (DRAM), synchronous DRAM (SDRAM), read-only memory (ROM), any combination of such, or the like. The mass storage element 1930 may include any type of non-transitory storage device, such as a solid state drive, hard disk drive, a magnetic disk drive, an optical disk drive, USB drive, or any computer program product configured to store data and machine executable program code. According to certain embodiments, the memory 1920 or mass storage 1930 may have recorded thereon statements and instructions executable by the processor 610 for performing any of the aforementioned method operations described above. For instance, the statements and instructions recorded on the memory 1920 or mass storage 1930 may include receiving and saving data stream, converting data sample into corresponding numerical values, detecting (valid) data frames, performing data windowing and segmentation, performing feature extraction, normalizing data indicative of extracted features, predicting a fall based on the developed machine learning model (e.g. developed SVM model), filtering fall-like events, other necessary instructions for fall event detection and any combination of such or the like. In some embodiments, memory 1920 or mass storage 1930 may have recorded thereon history of previous fall decisions (e.g. decisions made with respect to whether the event is a fall event, false alarm fall events). The history of previous fall decisions may be also recorded on an external database (not shown) that is communicatively connected to the device 1900, including, but not limited to, through the network interface 1950. The external database may comprise storage for the history of previous fall decisions associated with the device 1900 or storage for the history of previous fall decisions associated with every existing fall protection system. The external database therefore conveniently collects further data for re-training the machine learning based model either for individual users or in general.

The sensors 1970 may include any type of sensors such as accelerometer, gyroscope and barometric pressure sensor, any combination of such, or the like. According to some embodiments, the sensors 1970 may monitor activities of the user and provide various information related to the user activities. The information collected by the sensors 1970 may be used at one or more steps of detecting a fall event, for example at the feature extraction process (e.g. feature extraction process 509 at FIG. 5).

The alarm 1980 may generate notifying sound or generate help requests upon the confirmation of detection of a fall event. The generated help requests may be delivered to caregivers or medical professionals, for example via the network interface 1950. In some embodiments, the alarm 1980 may conduct other further procedures as instructed by the processor 1910 or otherwise configured in the device 1900. In some embodiments, the device 1900 is communicatively connected to an external system that sends help requests to caregivers or medical professionals. The external system may perform extra processes upon confirmation of detection of the fall event.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

In the foregoing description, exemplary modes for carrying out the invention in terms of examples have been described. However, the scope of the claims should not be limited by those examples, but should be given the broadest interpretation consistent with the description as a whole. The specification and drawings are, accordingly, to be regarded in an illustrative rather than a restrictive sense.

The invention has a number of aspects. Aspects of the invention include, without limitation:

1. A method for detecting an event associated with a user, comprising:
    collecting data associated with activities of the user from a plurality of sensors;
    distributing the collected data into sets indicative of a pre-fall moment, a fall moment, and a post-fall moment;
    extracting a plurality of features from the one or more sets; and
    determining whether the event is a fall event at least in part based on the extracted features.
2. The method of claim 1, wherein distributing includes distributing the collected data to data sub-windows using signal windowing and segmentation, the data sub-windows indicative of a pre-fall moment, a fall moment, and a post-fall moment and wherein extracting is performed by extracting a plurality of features from one or more of the data sub-windows.
3. The method of claim 1, wherein the plurality of sensors includes one or more of an accelerometer, a gyroscope and a barometric pressure sensor.
4. The method of claim 1, wherein determining is performed by a machine learning based method using a support vector machine (SVM).
5. The method of claim 1, wherein determining is performed by one or more of K-Nearest Neighbor (KNN), a neural network, logistic regression, Naïve Bayes and decision tree.
6. The method of claim 1, wherein each of the plurality of features is extracted in association with one or more of accelerometer data, gyroscope data and barometric pressure data.
7. The method of claim 1, wherein the plurality of features is extracted using one or more pre-defined fall templates.
8. The method of claim 7, wherein the pre-defined fall templates are generated based on one or more of signal magnitude vector (SMV) of acceleration and barometric pressure data.
9. The method of claim 4, further comprising:
    selecting a subset of data indicative of the extracted features for development of the machine learning based method.
10. The method of claim 1, further comprising:
    upon the event being determined to be a fall event, evaluating whether the fall event is true or an erroneously recognized fall event.
11. The method of claim 10, wherein the evaluating is performed using one or more rejection filters.

12. The method of claim 11, wherein the rejection filters include one or more of a dropping rejection filter, a going-to-bed rejection filter, a spinning rejection filter and a stair walking and running down rejection filter.

13. The method of claim 9, further comprising personalizing the method to the user, the personalizing comprising:
upon determining that the event was a fall event, receiving input from the user indicating that the event was erroneously determined to be a fall event; determined fall event;
re-training the machine learning based method on a data set comprising the second subset of data; and
determining whether further events are fall events for the user wherein the determining is performed by the re-trained machine learning based method.

14. The method of claim 1, further comprising normalizing the extracted features.

15. The method of claim 1, wherein extracting the plurality of features is performed in one or more of a time domain, a frequency domain and a time-frequency domain.

16. An apparatus for detecting an event associated with a user, the apparatus comprising:
a plurality of sensors for collecting data indicative of an event associated with activities of the user;
a processor; and
a memory storing machine executable instructions, the instructions when executed by the processor configure the apparatus to:
distribute the collected data into sets indicative of a pre-fall moment, a fall moment and a post-fall moment;
extract a plurality of features from one or more of the sets; and
determine whether the event is a fall event at least in part based on the extracted features.

17. The apparatus of claim 16, wherein the instructions when executed by the processor configure the apparatus to distribute which includes distributing the collected data to data sub-windows using signal windowing and segmentation, the data sub-windows indicative of a pre-fall moment, a fall moment, and a post-fall moment and to extract which includes extracting a plurality of features from one or more of the data sub-windows.

18. The apparatus of claim 16, wherein the plurality of sensors includes one or more of an accelerometer, a gyroscope and a barometric pressure sensor.

19. The apparatus of claim 16, wherein the instructions when executed by the processor configure the apparatus to, upon the event being determined to be a fall event, evaluate whether the fall event is true or an erroneously recognized fall event.

20. The apparatus of claim 19, wherein the evaluation is performed using one or more rejection filters.

21. The apparatus of claim 16 further comprising an alarm system, and wherein wherein the instructions when executed by the processor further configure the apparatus to, upon determination that the event is a fall event, generate a notification of the fall event.

22. The apparatus of claim 21, wherein the notification is sent to an external device directly.

23. The apparatus of claim 21, wherein the notification is sent to an external device via a network.

24 The apparatus of claim 16, wherein the apparatus further comprises a user input device, and wherein the instructions when executed by the processor further comprise configuring the apparatus to:
register a fall event as a false alarm in response to receiving a user input to the user input device; and
store collected data associated with the false alarm in the memory.

25. The apparatus of claim 24 wherein the determination is based at least in part on the extracted features and the collected data associated with the false alarm stored in the memory.

26. The apparatus of claim 16, wherein the instructions when executed by the processor further configure the apparatus to normalize the extracted features.

27. The apparatus of claim 16, wherein extracting the plurality of features is performed in one or more of a time domain, a frequency domain and a time-frequency domain.

28. The apparatus of claim 16, wherein the apparatus is portable or wearable.

The invention claimed is:

1. A method for detecting a fall event associated with a user, comprising:
collecting data associated with activities of the user by a wearable device comprising an alarm system and one or more of an accelerometer, a gyroscope and a barometric pressure sensor, wherein collecting the data comprises collecting the data from the one or more of the accelerometer, the gyroscope and the barometric pressure sensor;
distributing within a memory component of the wearable device the collected data into three sets indicative of a pre-fall moment, a fall moment, and a post-fall moment;
extracting by a processor of the wearable device a plurality of features from each of the three sets;
inferring by the processor of the wearable device that the data comprises a fall event, wherein the inferring uses the plurality of extracted features from each of the three sets as inputs to a model previously trained using machine learning; and
issuing from the alarm system an alarm indicative that the user has fallen, based at least in part on the determination that the data comprises a fall event.

2. The method of claim 1, wherein distributing includes distributing the collected data to data sub-windows using signal windowing and segmentation, the data sub-windows indicative of a pre-fall moment, a fall moment, and a post-fall moment and wherein extracting is performed by extracting a plurality of features from one or more of the data sub-windows.

3. The method of claim 1, wherein the machine learning based method comprises a support vector machine (SVM).

4. The method of claim 1, wherein determining comprises using one or more of a K-Nearest Neighbor (KNN) algorithm, a neural network, logistic regression, a Naïve Bayes algorithm and a decision tree.

5. The method of claim 1, wherein each of the plurality of features is extracted in association with one or more of accelerometer data, gyroscope data and barometric pressure data.

6. The method of claim 1, wherein the plurality of features is extracted using one or more pre-defined fall templates.

7. The method of claim 6, wherein the pre-defined fall templates are generated based on one or more of signal magnitude vector (SMV) of acceleration and barometric pressure data.

8. The method of claim 3, further comprising:
selecting a subset of data indicative of the extracted features for development of the machine learning based method.

9. The method of claim 1, further comprising:
upon determining that the data comprises a fall event, evaluating whether the fall event is true or an erroneously recognized fall event.

10. The method of claim 9, wherein the evaluating is performed using one or more rejection filters.

11. The method of claim 10, wherein the rejection filters include one or more of a dropping rejection filter, a going-to-bed rejection filter, a spinning rejection filter and a stair walking and running down rejection filter.

12. The method of claim 8, further comprising personalizing the method to the user, the personalizing comprising:
upon determining that the data comprises a fall event, receiving input from the user indicating that the event was erroneously determined to be a fall event;
re-training the machine learning based method on a data set comprising a second subset of data; and
determining whether further data comprises fall events for the user wherein the determining is performed by the re-trained machine learning based method.

13. The method of claim 1, further comprising normalizing the extracted features.

14. The method of claim 1, wherein extracting the plurality of features is performed in one or more of a time domain, a frequency domain and a time-frequency domain.

15. A wearable apparatus for detecting a fall event associated with a user, the wearable apparatus comprising:
one or more of an accelerometer, a gyroscope and a barometric pressure sensor for collecting data indicative of a potential fall event associated with activities of the user;
an alarm system;
a processor; and
a memory storing machine executable instructions, the instructions when executed by the processor configure the wearable apparatus to:
distribute the collected data into three sets indicative of a pre-fall moment, a fall moment and a post-fall moment;
extract a plurality of features from each of the three sets; and
infer by the processor of the wearable device that the data comprises a fall event, wherein in inference uses the plurality of extracted features from each of the three sets as inputs to a model previously trained using machine learning; and
issue an alarm indicative that the user has fallen from the alarm system based at least in part on the determination that the data comprises a fall event.

16. The wearable apparatus of claim 15, wherein the instructions when executed by the processor configure the apparatus to distribute which includes distributing the collected data to three data sub-windows using signal windowing and segmentation, the three data sub-windows indicative of a pre-fall moment, a fall moment, and a post-fall moment and to extract which includes extracting a plurality of features from each of the three data sub-windows.

17. The wearable apparatus of claim 15, wherein the instructions when executed by the processor configure the apparatus to, upon the data being determined to comprise a fall event, evaluate whether the fall event is true or an erroneously recognized fall event.

18. The wearable apparatus of claim 17, wherein the evaluation is performed using one or more rejection filters.

* * * * *